US011426804B2

(12) United States Patent
Valeriano, Jr. et al.

(10) Patent No.: US 11,426,804 B2
(45) Date of Patent: Aug. 30, 2022

(54) APPARATUSES AND METHODS FOR GUIDING A DRILL BIT TO FORM A HOLE

(71) Applicant: THE BOEING COMPANY, Chicago, IL (US)

(72) Inventors: Voltaire Valeriano, Jr., Lynnwood, WA (US); Matthew G. Kesterson, Everett, WA (US); Florante M. Halili, Renton, WA (US); Gregory Van, Renton, WA (US)

(73) Assignee: THE BOEING COMPANY, Chicago, IL (US)

( * ) Notice: Subject to any disclaimer, the term of this patent is extended or adjusted under 35 U.S.C. 154(b) by 118 days.

(21) Appl. No.: 16/879,443

(22) Filed: May 20, 2020

(65) Prior Publication Data

US 2021/0362879 A1 Nov. 25, 2021

(51) Int. Cl.
*B23B 47/28* (2006.01)
*B23B 49/02* (2006.01)
*B23B 49/04* (2006.01)

(52) U.S. Cl.
CPC ............ *B23B 47/28* (2013.01); *B23B 49/026* (2013.01); *B23B 49/04* (2013.01); *B23B 2247/12* (2013.01); *B23B 2260/118* (2013.01)

(58) Field of Classification Search
CPC ..... B23B 47/28; B23B 47/287; B23B 49/026; B23B 49/04; B23B 2247/12; B23B 2260/118

See application file for complete search history.

(56) References Cited

U.S. PATENT DOCUMENTS

| 2,376,842 | A | | 6/1946 | Wright | |
|---|---|---|---|---|---|
| 2,864,268 | A | * | 12/1958 | Anderson | ............... B23B 31/08 408/79 |
| 3,030,831 | A | * | 4/1962 | Wharton | ................. B23B 47/28 408/115 R |
| 3,065,656 | A | * | 11/1962 | Clinkenbeard | ......... B23B 39/00 408/97 |
| 4,474,514 | A | | 10/1984 | Jensen | |
| 4,669,926 | A | * | 6/1987 | Wilcox, Jr. | ........... B23B 47/281 269/87.3 |
| 5,609,444 | A | | 3/1997 | Valsecchi | |
| 5,807,033 | A | | 9/1998 | Benway | |

(Continued)

FOREIGN PATENT DOCUMENTS

| CH | 456302 A | * | 7/1968 |
|---|---|---|---|
| DE | 1236908 B | * | 3/1967 |

(Continued)

*Primary Examiner* — Eric A. Gates
(74) *Attorney, Agent, or Firm* — The Small Patent Law Group LLC; Joseph M. Butscher

(57) ABSTRACT

An assembly for guiding a drill bit of a drill assembly comprises a chassis and a centering bushing, comprising an exterior conical portion and a central opening. The assembly further comprises a vacuum-cup bracket, coupled to the chassis and adjustably positionable relative to the chassis along a second axis. The assembly also comprises vacuum cups, coupled to the vacuum-cup bracket. The assembly additionally comprises a pressure foot, coupled to the chassis at the first end of the chassis and adjustably positionable relative to the chassis along the second axis.

20 Claims, 13 Drawing Sheets

(56) References Cited

U.S. PATENT DOCUMENTS

| | | | | |
|---|---|---|---|---|
| 5,984,594 | A * | 11/1999 | Osborne | B23B 47/28 |
| | | | | 408/101 |
| 6,116,826 | A * | 9/2000 | Benway | B23B 47/28 |
| | | | | 144/144.1 |
| 7,498,796 | B2 * | 3/2009 | Georgeson et al. | B23B 49/00 |
| | | | | 324/67 |
| 7,896,040 | B2 * | 3/2011 | Gill | B23B 47/28 |
| | | | | 144/144.1 |
| 8,413,307 | B2 * | 4/2013 | Katzenberger | B25H 1/0071 |
| | | | | 408/239 R |
| 8,757,938 | B2 * | 6/2014 | Ferreras | B23B 47/28 |
| | | | | 408/114 |
| 9,636,753 | B2 * | 5/2017 | Anson | B23B 49/026 |
| 2006/0251481 | A1 | 11/2006 | Behman | |
| 2017/0246696 | A1 * | 8/2017 | He | B23B 49/026 |

FOREIGN PATENT DOCUMENTS

| | | | |
|---|---|---|---|
| GB | 796057 A | * | 6/1958 |
| GB | 886158 A | * | 1/1962 |
| GB | 1159955 A | * | 7/1969 |
| GB | 2203069 A | * | 10/1988 |

* cited by examiner

APPARATUSES AND METHODS FOR GUIDING A DRILL BIT TO FORM A HOLE

TECHNICAL FIELD

The subject matter, disclosed herein, relates to apparatuses and methods for forming drilled holes.

BACKGROUND

During assembly of various structures, in some applications, holes are drilled in components of such structures for attachment to other components of the structures. Accordingly, corresponding holes in mating components should be aligned. However, the use of conventional alignment aids to drill the holes is time consuming and may result in inconsistent quality of the drilled holes.

SUMMARY

Accordingly, apparatuses and methods, intended to address at least the above-identified concerns, would find utility.

The following is a non-exhaustive list of examples, which may or may not be claimed, of the subject matter, disclosed herein.

Disclosed herein is an assembly for guiding a drill bit of a drill assembly. The drill assembly comprises a nose-piece, having an upper end and a lower end. The assembly comprises a chassis, having a first end and a second end, located opposite each other along a first axis. The assembly also comprises a centering bushing, located at the second end of the chassis. The centering bushing comprises an exterior conical portion, having a first azimuthal-symmetry axis, and a central opening, having a second azimuthal-symmetry axis, collinear with the first azimuthal-symmetry axis. Further, the assembly comprises a vacuum-cup bracket, coupled to the chassis between the first end and the second end and adjustably positionable relative to the chassis along a second axis that is normal to the first axis. Also, the assembly comprises vacuum cups, coupled to the vacuum-cup bracket. The assembly additionally comprises a pressure foot, coupled to the chassis at the first end of the chassis and adjustably positionable relative to the chassis along the second axis.

The assembly provides for convenient, reliable, accurate placement of a drill bit for drilling holes in the structure. The assembly enables the drilling of multiple holes to match a template (e.g. a pattern of holes in the component to be mounted to the base structure 100) without requiring use of a drill jig, thereby reducing time of drilling and set-up, reducing cost of additional equipment, and improving accuracy. The centering bushing enables accurate placement and alignment of the drill bit. The vacuum cup bracket enables accurate and secure placement of the vacuum cups for applying a vacuum to reliably secure the assembly in place during drilling of holes. The pressure foot provides secure positioning of the assembly against a surface of the structure and/or a surface of the component.

Also disclosed herein is a method of guiding a drill bit of a drill assembly through a component to form a hole in a base structure. The component comprises a stepped obverse surface, a reverse surface, spaced from the stepped obverse surface, and a countersunk surface, having a minimum diameter and a maximum diameter and bounded by the stepped obverse surface. The stepped obverse surface comprises a plurality of step-like surfaces, offset relative to each other. The component is positioned such that at least a portion of the reverse surface is in contact with an obverse surface of the base structure. The method comprises positioning an exterior conical portion of a centering bushing such that at least a portion of the exterior conical portion is located within a countersunk opening, defined by the countersunk surface of the component. The centering bushing is coupled to a chassis that has a first end and a second end, located opposite the first end along a first axis, and the centering bushing is located at the second end of the chassis. The method also comprises positioning a pressure foot, coupled to the chassis at the first end of the chassis, in contact with the obverse surface of the base structure or in contact with at least one of the plurality of step-like surfaces of the component. The method additionally comprises positioning vacuum cups of a vacuum-cup bracket, coupled to the chassis between the first end and the second end of the chassis, in contact with the obverse surface of the base structure or in contact with at least one of the plurality of step-like surfaces of the component. The method further comprises applying vacuum to the vacuum cups to preload the pressure foot against the obverse surface of the base structure or against the one of the plurality of step-like surfaces of the stepped obverse surface of the component and to preload the exterior conical portion of the centering bushing against the countersunk surface of the component, such that the exterior conical portion of the centering bushing mates with the countersunk surface of the component in a geometrically complementary relationship. The method also comprises rotationally advancing the drill bit through the component and into the base structure while guiding the drill bit using a central opening of the centering bushing to form, in the base structure, the hole that has a diameter, which is equal to or less than the minimum diameter of the countersunk surface of the component. The hole and the countersunk surface share an azimuthal-symmetry axis.

The method provides for convenient, reliable, accurate placement of a drill bit for drilling holes in the structure. The method facilitates the drilling of multiple holes to match a template (e.g. a pattern of holes in the component to be mounted to the base structure 100) without requiring use of a drill jig, thereby reducing time of drilling and set-up, reducing cost of additional equipment, and improving accuracy. Positioning the exterior conical portion of the centering bushing with at least a portion within the countersunk opening facilitates convenient, accurate placement of the centering bushing to facilitate accurate placement and alignment of the drill bit. Positioning the pressure foot in contact with the obverse surface of the base structure or in contact with at least one of the step-like surfaces facilitates secure placement and securement of the assembly during use. Positioning the vacuum cups in contact with the obverse surface of the base structure or in contact with at least one of the step-like surfaces facilitates secure placement and securement of the assembly during use, and facilitates reliable placement of the vacuum cups for applying a vacuum to reliably secure the assembly in place during drilling of holes. Applying vacuum to the vacuum cups releasably secures the assembly in place. Rotationally advancing the drill bit through the component forms a desired hole (e.g., for use in conjunction with a fastener).

BRIEF DESCRIPTION OF THE DRAWINGS

Reference will now be made to the accompanying drawings, which are not necessarily drawn to scale, and where like reference characters designate the same or similar parts throughout the several views. In the drawings:

FIG. 1 is a schematic, elevation, end view of the vacuum-cup adjustment arm of FIG. 7, according to one or more examples of the subject matter, disclosed herein;

DETAILED DESCRIPTION

Figure 1A:
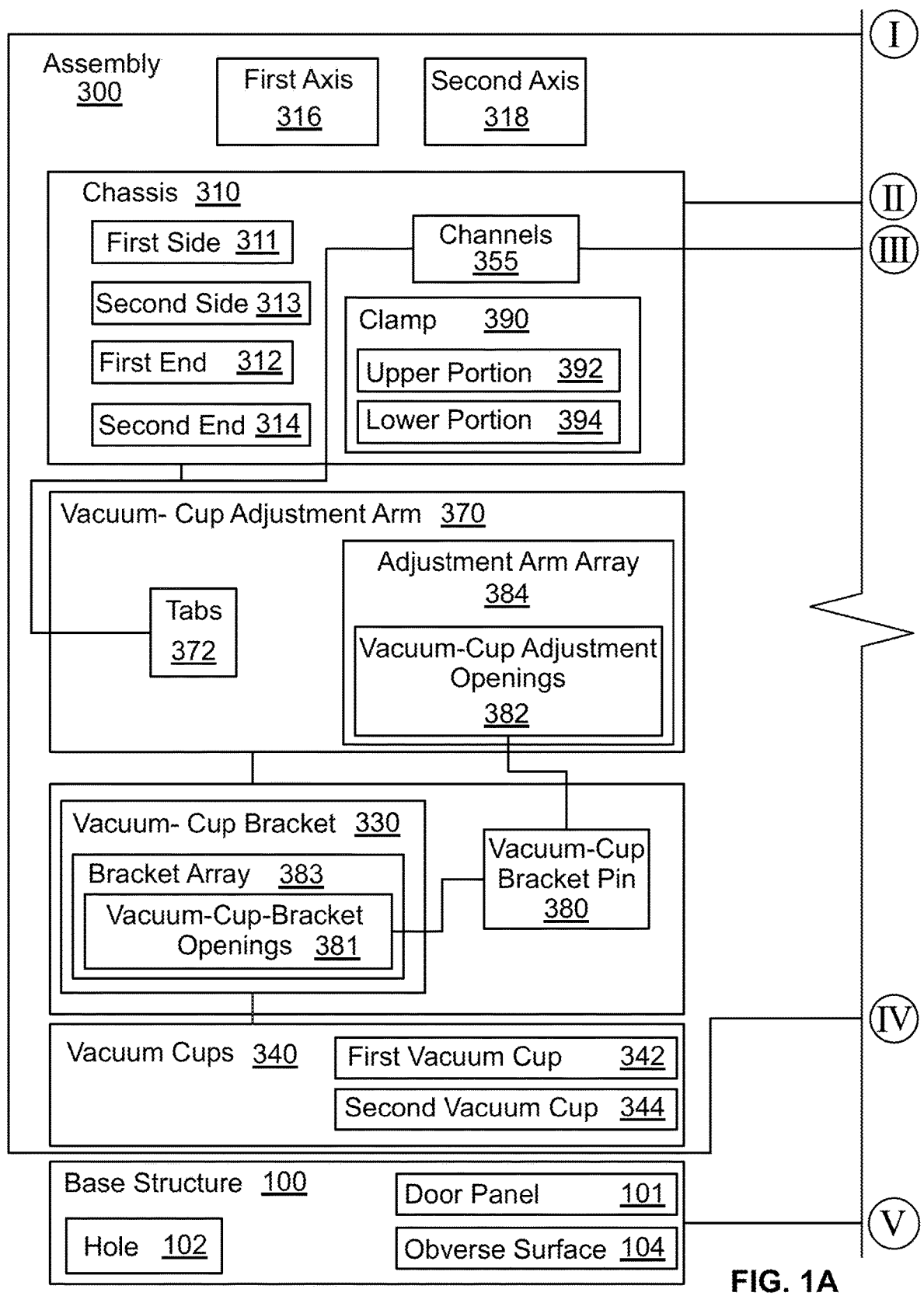
FIGS. 1A and 1B, collectively, are a block diagram of an apparatus for guiding a drill bit, according to one or more examples of the subject matter, disclosed herein.
Figure 1B:
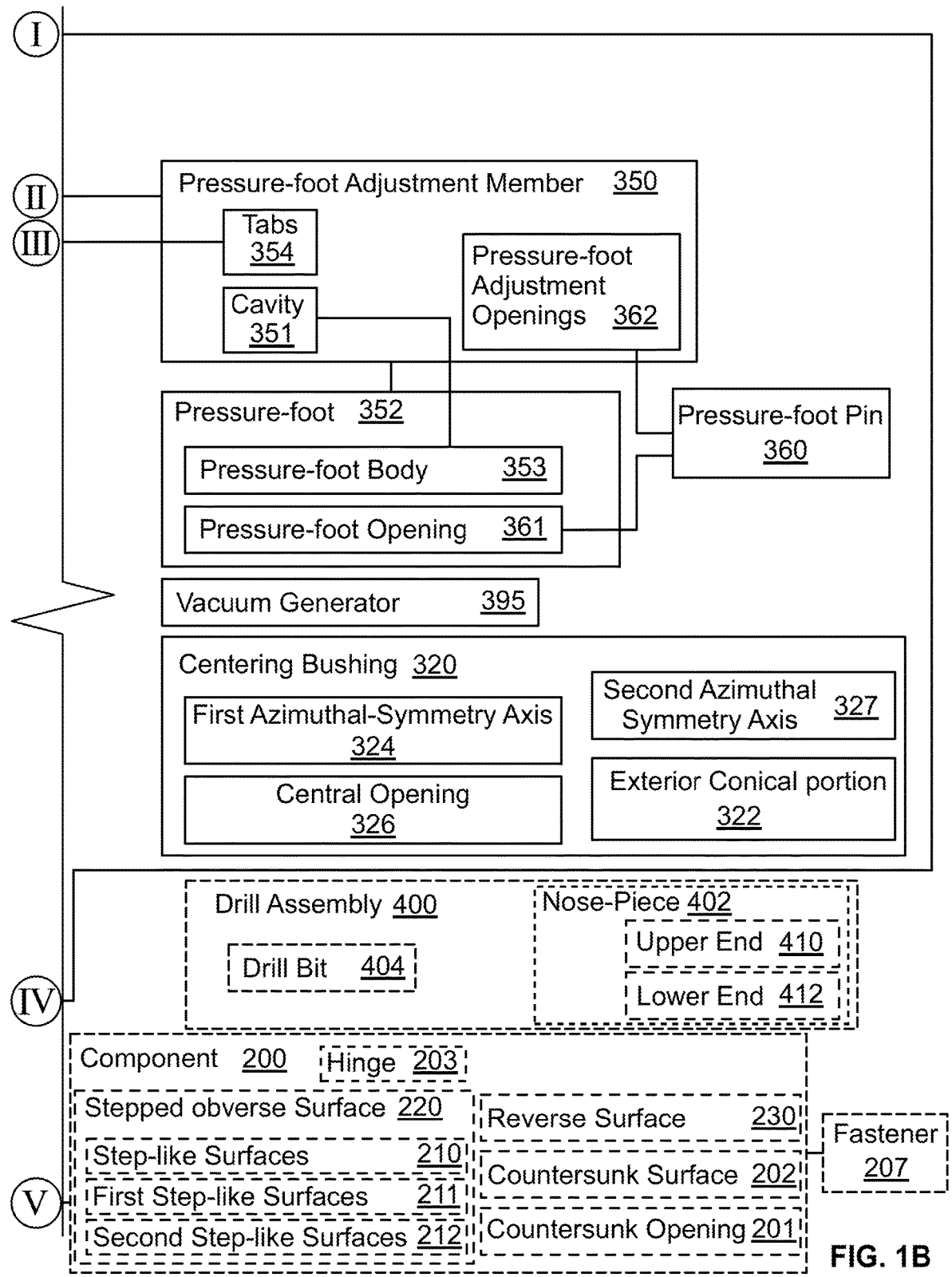

In FIGS. 1A and 1B, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the subject matter, disclosed herein. Likewise, elements and/or components, if any, represented with dashed lines, indicate alternative examples of the subject matter, disclosed herein. One or more elements shown in solid and/or dashed lines may be omitted from a particular example without departing from the scope of the subject matter, disclosed herein. Environmental elements, if any, are represented with dotted lines. Virtual (imaginary) elements may also be shown for clarity. Those skilled in the art will appreciate that some of the features illustrated in FIGS. 1A and 1 B may be combined in various ways without the need to include other features described in FIGS. 1A and 1B, other drawing figures, and/or the accompanying disclosure, even though such combination or combinations are not explicitly illustrated herein. Similarly, additional features not limited to the examples presented, may be combined with some or all of the features shown and described herein.

In FIGS. 13A, 13B, 13C, and 14, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 13A, 13B, 13C, and 14 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one or more examples" means that one or more feature, structure, or characteristic described in connection with the example is included in at least one implementation. The phrase "one or more examples" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples, which may or may not be claimed, of the subject matter, disclosed herein, are provided below.

Referring generally to FIGS. 1A and 1B and particularly to, e.g., FIGS. 2-12 for illustrative purposes only and not by way of limitation, assembly 300 for guiding drill bit 404 of drill assembly 400 is disclosed. Drill assembly 400 comprises nose-piece 402, having upper end 410 and lower end 412. Assembly 300 comprises chassis 310, having first end 312 and second end 314, located opposite each other along first axis 316. Assembly 300 also comprises centering bushing 320, located at second end 314 of chassis 310. Centering bushing 320 comprises exterior conical portion 322, having first azimuthal-symmetry axis 324. Centering bushing 320 also comprises central opening 326, having second azimuthal-symmetry axis 327, collinear with first azimuthal-symmetry axis 324. Assembly 300 also comprises vacuum-cup bracket 330, coupled to chassis 310 between first end 312 and second end 314 and adjustably positionable relative to chassis 310 along second axis 318 that is normal to first axis 316. Assembly 300 additionally comprises vacuum cups 340, coupled to vacuum-cup bracket 330. Assembly 300 further comprises pressure foot 352, coupled to chassis 310 at first end 312 of chassis 310 and adjustably positionable relative to chassis 310 along second axis 318. The preceding portion of this paragraph characterizes example one of the subject matter, disclosed herein.

Assembly 300 provides convenient, reliable, accurate placement of a drill bit for drilling holes in structure 100. Assembly 300 enables the drilling of multiple holes to match a template (e.g. a pattern of holes in component 200 to be mounted to base structure 100) without requiring use of a drill jig, thereby reducing time of drilling and set-up, reducing cost of additional equipment, and improving accuracy. Centering bushing 320 enables accurate placement and alignment of drill bit 404. Vacuum cup bracket 330 enables accurate and secure placement of vacuum cups 340 for applying a vacuum to reliably secure assembly 300 in place during drilling of holes. Pressure foot 352 provides secure positioning of assembly 300 against a surface of structure 100 and/or a surface of component 200.

For the purposes of this disclosure, "along" means coaxial with or parallel to. Accordingly, first end 312 and second end 314 are oriented coaxial with or parallel to first axis 316. It should be noted that orientational terms such as "along," "coaxial with," "parallel to," "collinear," or "normal" are used herein in a nominal sense, and include variations from the base term within a tolerance (e.g., a predetermined variation based on manufacturing processes or capabilities.) In one or more examples, first axis 316 is oriented generally horizontally and second axis 318 is oriented vertically. However, other alignments are possible. In one or more examples, second axis 318 is oriented horizontally and first axis 316 oriented vertically.

For the purposes of this disclosure, "azimuthal symmetry" means symmetric around a straight line, such that an azimuthally symmetric object appears the same during a rotation about a given axis of azimuthal symmetry. In one or more examples, first azimuthal-symmetry axis 324 and second azimuthal-symmetry axis 327 are each oriented along second axis 318.

Figure 12:
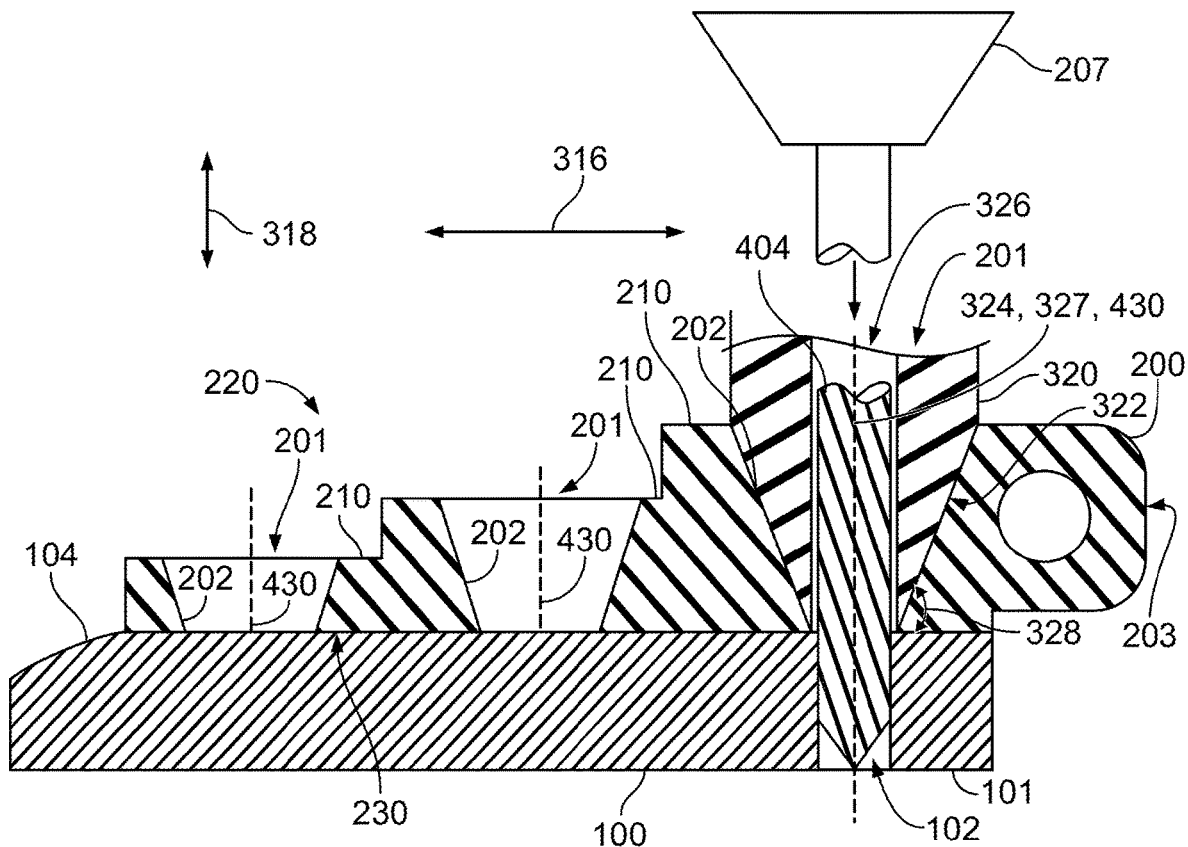
FIG. 12 is a schematic, elevation, sectional view of a sub-assembly of the apparatus of FIGS. 1A and 1B, according to one or more examples of the subject matter, disclosed herein.

In one or more examples, with reference to, for example, FIG. 12, assembly 300 is used to drill holes in base structure 100 to match holes already present in component 200 or other template. In one or more example, component 200 includes pre-drilled holes, and assembly 300 is used to drill corresponding holes in base structure 100, with the holes, used for fasteners, joining component 200 to base structure 100. In one or more example, component 200 is configured as hinge 203 and base structure 100 is configured as door panel 101 (e.g., of an aircraft).

In one or more examples, assembly 300 is used to drill holes in base structure 100 at a location of assembly of component 200 with base structure 100. At the site of assembly, component 200 is positioned in a desired, predetermined relationship with base structure 100. With component 200 in place, assembly 300 is used to guide drill bit 404 to provide holes in base structure 100 that correspond to pre-existing holes of component 200 such that holes through base structure 100 and component 200 are accurately aligned with each other. Aspects of assembly 300, such as centering bushing 320 are configured in one or more examples to cooperate with features (e.g., a countersink) of holes in component 200 to help improve or facilitate alignment of drill bit 404 with pre-existing holes in component 200.

With reference to FIG. 12, in one or more examples, assembly 300 is used in connection with base structure 100 and/or component 200 having stepped or tiered surfaces. As seen in FIG. 12, component 200 includes, in one or more examples, stepped obverse surface 220, having a step-like surface. Vertical adjustment provided by assembly 300 (e.g., adjustability along second axis 318 of vacuum-cup bracket 330 and/or of pressure foot 352) facilitates use of assembly 300 in connection with surfaces, having varying elevations.

Referring generally to FIGS. 1A and 1B and particularly to, e.g., FIGS. 2-5 for illustrative purposes only and not by way of limitation, pressure foot 352 is adjustably positionable relative to chassis 310 along first axis 316. The preceding portion of this paragraph characterizes example two of the subject matter, disclosed herein, where example two also encompasses example one, above.

Pressure foot 352 that is adjustably positionable relative to chassis 310 enables convenient placement and adjustment of pressure foot 352 for using assembly 300 on a variety of surfaces. In one or more examples, base structure 100 and/or component 200 have stepped or tiered surfaces, with the adjustability of pressure foot 352 allowing for pressure foot 352 to be placed at different elevations relative to a hole being drilled.

In one or more examples, pressure foot 352 includes contoured surface 356. Contoured surface 356 is shaped to match or otherwise cooperate with the shape of a surface, against which pressure foot 352 is urged against by influence of a vacuum, applied via vacuum cups 340.

Referring generally to FIGS. 1A and 1B and particularly to, e.g., FIGS. 2-5, 8, and 9 for illustrative purposes only and not by way of limitation, assembly 300 further comprises pressure-foot adjustment member 350, coupled to chassis 310 and translatable relative to chassis 310. Pressure foot 352 is coupled to chassis 310 via pressure-foot adjustment member 350. The preceding portion of this paragraph characterizes example three of the subject matter, disclosed herein, where example three also encompasses example two, above.

Pressure-foot adjustment member 350 provides for secure, adjustable mounting of pressure foot 352 to chassis 310.

In one or more examples, pressure-foot adjustment member 350 is translatable relative to chassis 310 along first axis 316. In one or more examples, pressure-foot adjustment member 350 is accordingly positioned along first axis 316 relative to a hole to be drilled at a desired location, providing appropriate room and/or rigidity for placement of pressure-foot adjustment member 350 to secure assembly 300 in place during use.

In one or more examples, pressure-foot adjustment member 350 includes cavity 351 that receives pressure-foot body 353. It should be noted that other mounting arrangements may be utilized. In one or more examples, pressure-foot body 353 includes a cavity that accepts pressure-foot adjustment member 350. In one or more examples, pressure-foot adjustment member 350 and pressure-foot body 353 are formed as an integral unit.

Referring generally to FIGS. 1A and 1B and particularly to, e.g., FIGS. 2-5, 8, and 9 for illustrative purposes only and not by way of limitation, chassis 310 comprises channels 355, extending along first axis 316, and pressure-foot adjustment member 350 comprises tabs 354 that are received by channels 355 of chassis 310. The preceding portion of this paragraph characterizes example four of the subject matter, disclosed herein, where example four also encompasses example three, above.

Use of channels 355 and tabs 354 of pressure-foot adjustment member 350 that cooperate with each other enables convenient, continuous adjustability of pressure-foot adjustment member 350 with respect to chassis 310 (e.g., along first axis 316).

In one or more examples, channel 355 is sized to provide a clearance with tabs 354. Then, after pressure-foot adjustment member 350 has been translated to a desired position for use of assembly 300, in one or more examples, vacuum is applied via vacuum cups 340, resulting in lower corresponding surfaces of tabs 354 being urged against upward facing surfaces of channels 355 to secure pressure-foot adjustment member 350 (and pressure foot 352) in place.

Referring generally to FIGS. 1A and 1B and particularly to, e.g., FIGS. 2-5 for illustrative purposes only and not by way of limitation, vacuum-cup bracket 330 is adjustably positionable relative to chassis 310 along first axis 316. The preceding portion of this paragraph characterizes example five of the subject matter, disclosed herein, where example five also encompasses example four, above.

Adjustability of vacuum-cup bracket 330 along first axis 316 enables convenient positioning of the vacuum-cup bracket at desired or optimal locations along a surface relative to a hole to be drilled.

Referring generally to FIGS. 1A and 1B and particularly to, e.g., FIGS. 2-7 for illustrative purposes only and not by way of limitation, assembly 300 further comprises vacuum-cup adjustment arm 370, coupled to chassis 310 and movable relative to chassis 310. Vacuum-cup bracket 330 is coupled to chassis 310 via vacuum-cup adjustment arm 370. The preceding portion of this paragraph characterizes example six of the subject matter, disclosed herein, where example six also encompasses example five, above.

Vacuum-cup adjustment arm 370 provides for secure, adjustable mounting of vacuum-cup bracket 330 to chassis 310.

In one or more examples, vacuum-cup adjustment arm 370 is translatable relative to chassis 310 along first axis 316. In one or more examples, vacuum-cup adjustment arm 370 is accordingly positioned along first axis 316 relative to a hole to be drilled at a desired location, providing appropriate room and/or rigidity for placement of vacuum-cup adjustment arm 370 to secure assembly 300 in place during use.

In one or more examples, vacuum-cup adjustment arm 370 includes a projection, or other portion, that is accepted by a corresponding cavity of vacuum-cup bracket 330. It should be noted that other mounting arrangements may be utilized. In one or more examples, vacuum-cup adjustment arm 370 and vacuum-cup bracket 330 are formed as an integral unit.

Referring generally to FIGS. 1A and 1B and particularly to, e.g., FIGS. 2-7 for illustrative purposes only and not by way of limitation, vacuum-cup adjustment arm 370 comprises tabs 372 that are received by channels 355 of chassis 310. The preceding portion of this paragraph characterizes example seven of the subject matter, disclosed herein, where example seven also encompasses example six, above.

Use of channels 355 of chassis 310 and tabs 372 of vacuum-cup adjustment arm 370 that cooperate with each other enables convenient, continuous adjustability of vacuum-cup bracket 330 (and vacuum cups 340) with respect to chassis 310 (e.g., along first axis 316).

In one or more examples, channel 355 is sized to provide a clearance with tabs 372. Then, after vacuum-cup bracket 330 has been translated to a desired position for use of assembly 300, in one or more examples, vacuum is applied via vacuum cups 340, resulting in lower corresponding surfaces of tabs 372 being urged against upward facing surfaces of channels 355 to secure vacuum-cup adjustment arm 370 (and vacuum-cup bracket 330) in place. In one or more examples, channels 355 receive both tabs 372 of vacuum-cup adjustment arm 370 and tabs 354 of pressure-foot adjustment member 350.

Referring generally to FIGS. 1A and 1B and particularly to, e.g., FIGS. 2-5 and 8-10 for illustrative purposes only and not by way of limitation, pressure foot 352 comprises pressure-foot body 353. Pressure-foot adjustment member 350 comprises cavity 351, configured to receive pressure-foot body 353. Cavity 351 extends along second axis 318. The preceding portion of this paragraph characterizes example eight of the subject matter, disclosed herein, where example eight also encompasses any one of examples three to seven, above.

Cavity 351 of pressure-foot adjustment member 350 receiving the pressure-foot body enables accurate, secure positioning and maintenance of positioning of pressure foot in a desired (e.g., vertical) position, and prevents cocking or other movement of pressure foot 352 when vacuum is applied.

Referring generally to FIGS. 1A and 1B and particularly to, e.g., FIGS. 2-5 and 8-10 for illustrative purposes only and not by way of limitation, assembly 300 further comprises pressure-foot pin (360). Pressure foot 352 comprises pressure-foot opening 361, extending along first axis 316. Pressure-foot pin 360 is capable of being received by pressure-foot opening 361. The preceding portion of this paragraph characterizes example nine of the subject matter, disclosed herein, where example nine also encompasses any one of examples one to eight, above.

Cooperating pressure-foot opening 361 of pressure foot 352 and pressure-foot pin 360 enables convenient, accurate, adjustable, and releasable securement of pressure foot 352 in place.

Referring generally to FIGS. 1A and 1B and particularly to, e.g., FIGS. 2-5 and 8-10 for illustrative purposes only and not by way of limitation, assembly 300 further comprises pressure-foot adjustment member 350, fixed to chassis 310 along second axis 318 and comprising pressure-foot adjustment openings 362, situated at different locations along second axis 318. Any one of pressure-foot adjustment openings 362 and any one of pressure-foot opening 361 are capable of collectively receiving pressure-foot pin 360 to fix pressure foot 352 relative to chassis 310 along second axis 318. The preceding portion of this paragraph characterizes example ten of the subject matter, disclosed herein, where example ten also encompasses example nine, above.

Pressure-foot pin 360 receivable by pressure-foot opening 361 and pressure-foot adjustment openings 362 provides convenient, releasable securement of pressure foot 352 in place. Pressure-foot adjustment openings 362 situated at different locations along second axis 318 allow for adjustable positioning of pressure foot 352 relative to chassis 310 along second axis 318.

Referring generally to FIGS. 1A and 1B and particularly to, e.g., FIGS. 2-5 for illustrative purposes only and not by way of limitation, assembly 300 further comprises vacuum-cup-bracket pin 380. Vacuum-cup bracket 330 comprises bracket array 383 of vacuum-cup-bracket openings 381, each extending along an axis, perpendicular to second axis 318. Any one of vacuum-cup-bracket openings 381 is capable of receiving vacuum-cup-bracket pin 380. The preceding portion of this paragraph characterizes example eleven of the subject matter, disclosed herein, where example eleven also encompasses any one of examples one to ten, above.

Vacuum-cup-bracket pin 380 receivable by vacuum-cup-bracket openings 381 provides convenient, releasable securement of vacuum-cup bracket 330 in place. Bracket array 383 of vacuum-cup-bracket openings 381 enables adjustable positioning of vacuum-cup bracket 330.

Referring generally to FIGS. 1A and 1B and particularly to, e.g., FIGS. 2-7 for illustrative purposes only and not by way of limitation, assembly 300 further comprises vacuum-cup adjustment arm 370, which is fixed to chassis 310 along second axis 318 and which comprises adjustment-arm array 384 of vacuum-cup-adjustment-arm openings 382. Any one of vacuum-cup-adjustment-arm openings 382 and corresponding one of vacuum-cup-bracket openings 381 are capable of collectively receiving vacuum-cup-bracket pin 380 so that vacuum-cup bracket 330 is fixed relative to chassis 310 along second axis 318. The preceding portion of this paragraph characterizes example twelve of the subject matter, disclosed herein, where example twelve also encompasses example eleven, above.

Vacuum-cup-bracket pin 380 receivable by vacuum-cup-bracket openings 381 and vacuum-cup-adjustment-arm openings 382 provides convenient, releasable securement of vacuum-cup 340 in place. Adjustment-arm array 384 of vacuum-cup adjustment-arm openings 382 enables adjustable positioning of pressure foot 352 relative to chassis 310 along second axis 318.

Referring generally to FIGS. 1A and 1B and particularly to, e.g., FIGS. 2-7 for illustrative purposes only and not by way of limitation, one of adjustment-arm array 384 of vacuum-cup-adjustment-arm openings 382 or bracket array 383 of vacuum-cup-bracket openings 381 extends along first axis 316 and the other one of adjustment-arm array 384 of vacuum-cup-adjustment-arm openings 382 or bracket array 383 of vacuum-cup-bracket openings 381 is oblique to first axis 316. The preceding portion of this paragraph characterizes example thirteen of the subject matter, disclosed herein, where example thirteen also encompasses example twelve, above.

Orientation of adjustment-arm array 384 of vacuum-cup adjustment arm 370 and bracket array 383 of vacuum-cup-bracket openings at an oblique angle with respect to each other enables finer adjustment along second axis 318 than an alignment, having holes of both arrays aligned in the same direction.

Figure 2:
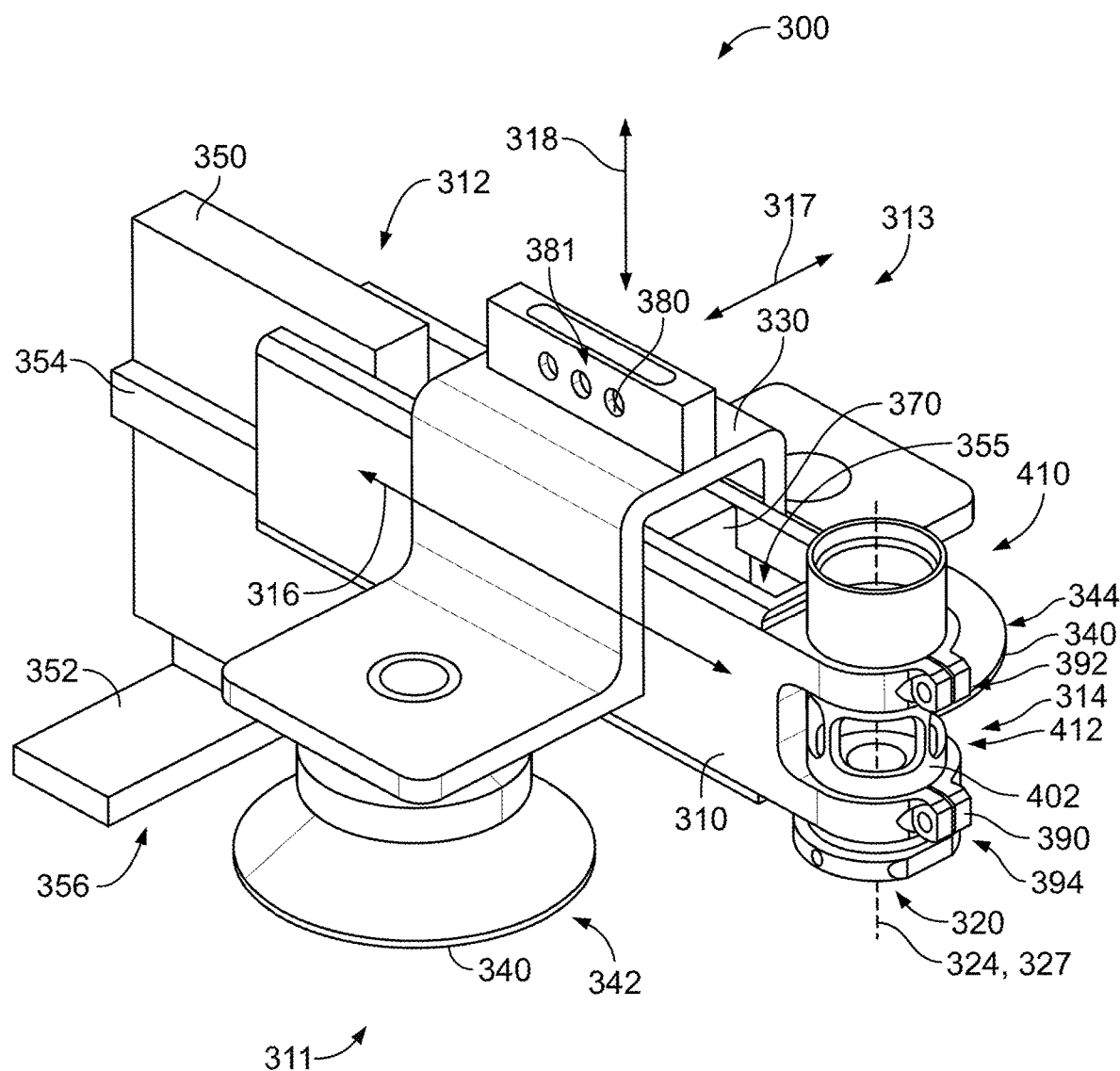
FIG. 2 is a schematic, perspective view of the apparatus of FIGS. 1A and 1B, according to one or more examples of the subject matter, disclosed herein.
Figure 3:
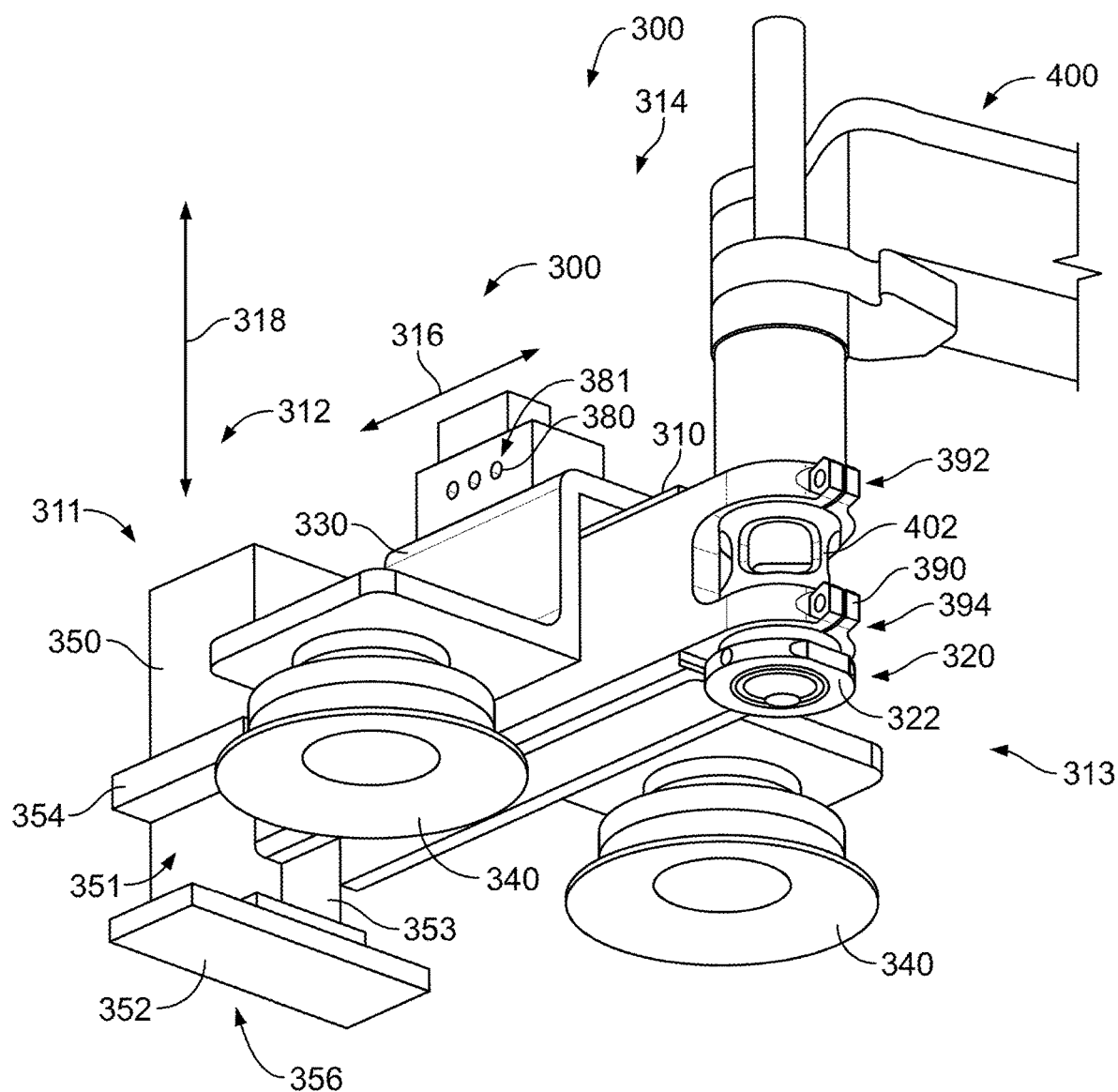
FIG. 3 is a schematic, perspective, view of the apparatus of FIGS. 1A and 1B, according to one or more examples of the subject matter, disclosed herein.

Referring generally to FIGS. 1A and 1B and particularly to, e.g., FIGS. 2 and 3 for illustrative purposes only and not by way of limitation, chassis 310 comprises clamp 390, located at second end 314 of chassis 310. Clamp 390 is configured to secure nose-piece 402 of drill assembly 400. The preceding portion of this paragraph characterizes example fourteen of the subject matter, disclosed herein, where example fourteen also encompasses any one of examples one to thirteen, above.

Clamp 390 enables securement of nose-piece 402 in place during drilling for accurate placement and use of drill bit 404.

In one or more examples, clamp 390 includes one or more members configured to accept nose-piece 402 in a first state, and to secure nose-piece 402 in place in a second state. In one or more examples, a threaded portion is used to tighten clamp 390 from the first state to the second state. In one or more examples, clamp 390 is separately joined to chassis 310, or alternatively, all or a portion of clamp 390 is integrally formed with chassis 310.

Referring generally to FIGS. 1A and 1B and particularly to, e.g., FIGS. 2 and 3 for illustrative purposes only and not by way of limitation, clamp 390 of chassis 310 comprises upper portion 392, configured to be connected to upper end 410 of nose-piece 402. Clamp 390 of chassis 310 also comprises lower portion 394, configured to be connected to lower end 412 of nose-piece 402. The preceding portion of this paragraph characterizes example fifteen of the subject matter, disclosed herein, where example fifteen also encompasses example fourteen, above.

Upper portion 392 and lower portion 394 provide two locations for connecting to nose-piece 402 facilitating prevention of cocking or other movement of drill assembly 400 during use.

Referring generally to FIGS. 1A and 1B and particularly to, e.g., FIGS. 2 and 3 for illustrative purposes only and not by way of limitation, centering bushing 320 is secured to nose-piece 402 of drill assembly 400 when nose-piece 402 is secured in clamp 390. The preceding portion of this paragraph characterizes example sixteen of the subject matter, disclosed herein, where example sixteen also encompasses example fourteen or fifteen, above.

Securement of centering bushing 320 t nose-piece 402 of drill assembly 400 when nose-piece 402 is secured in clamp 390 provides convenient reliable securement of drill assembly 400 and assembly 300 with respect to each other during use.

In one or more examples, centering bushing 320 is first secured to nose-piece 402 of drill assembly 400, and the nose-piece of drill assembly 400 is secured to clamp 390 of assembly 300. In one or more examples, centering bushing 320 is secured to chassis 310 indirectly (e.g., via nose-piece 402 and clamp 390).

Referring generally to FIGS. 1A and 1B and particularly to, e.g., FIGS. 2 and 3 for illustrative purposes only and not by way of limitation, centering bushing 320 is threaded into nose-piece 402 of drill assembly 400 when nose-piece 402 is secured in clamp 390. The preceding portion of this paragraph characterizes example seventeen of the subject matter, disclosed herein, where example seventeen also encompasses example sixteen, above.

Threading of centering bushing 320 into nose-piece 402 enables convenient, reliable, releasable securement of centering bushing 320 to nose-piece 402.

Figure 11:
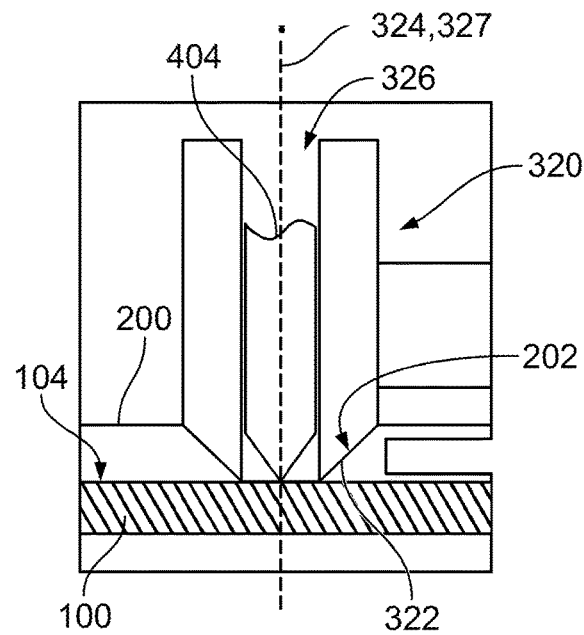
FIG. 11 is a schematic, elevation, sectional view of a sub-assembly of the apparatus of FIGS. 1A and 1B, according to one or more examples of the subject matter, disclosed herein.

Referring generally to FIGS. 1A and 1B and particularly to, e.g., FIGS. 2, 3, and 11 for illustrative purposes only and not by way of limitation, exterior conical portion 322 of centering bushing 320 defines a taper angle, which is complementary to that, defined by countersunk surface 202, against which centering bushing 320 is positioned during use of drill bit 404. The preceding portion of this paragraph characterizes example eighteen of the subject matter, disclosed herein, where example eighteen also encompasses any one of examples one to seventeen, above.

Exterior conical portion 322 of centering bushing 320 having taper angle complementary to angle defined by countersunk surface 202 enables reliable, repeatable, accurate placement of exterior conical portion 322 against countersunk surface 202 during positioning, alignment, and use of assembly 300.

For the purpose of this disclosure, "complementary" describes geometric shapes that fit together with precision in a hand-and-glove arrangement, like a shank and a receiver or a tenon and a mortise.

Figure 4:
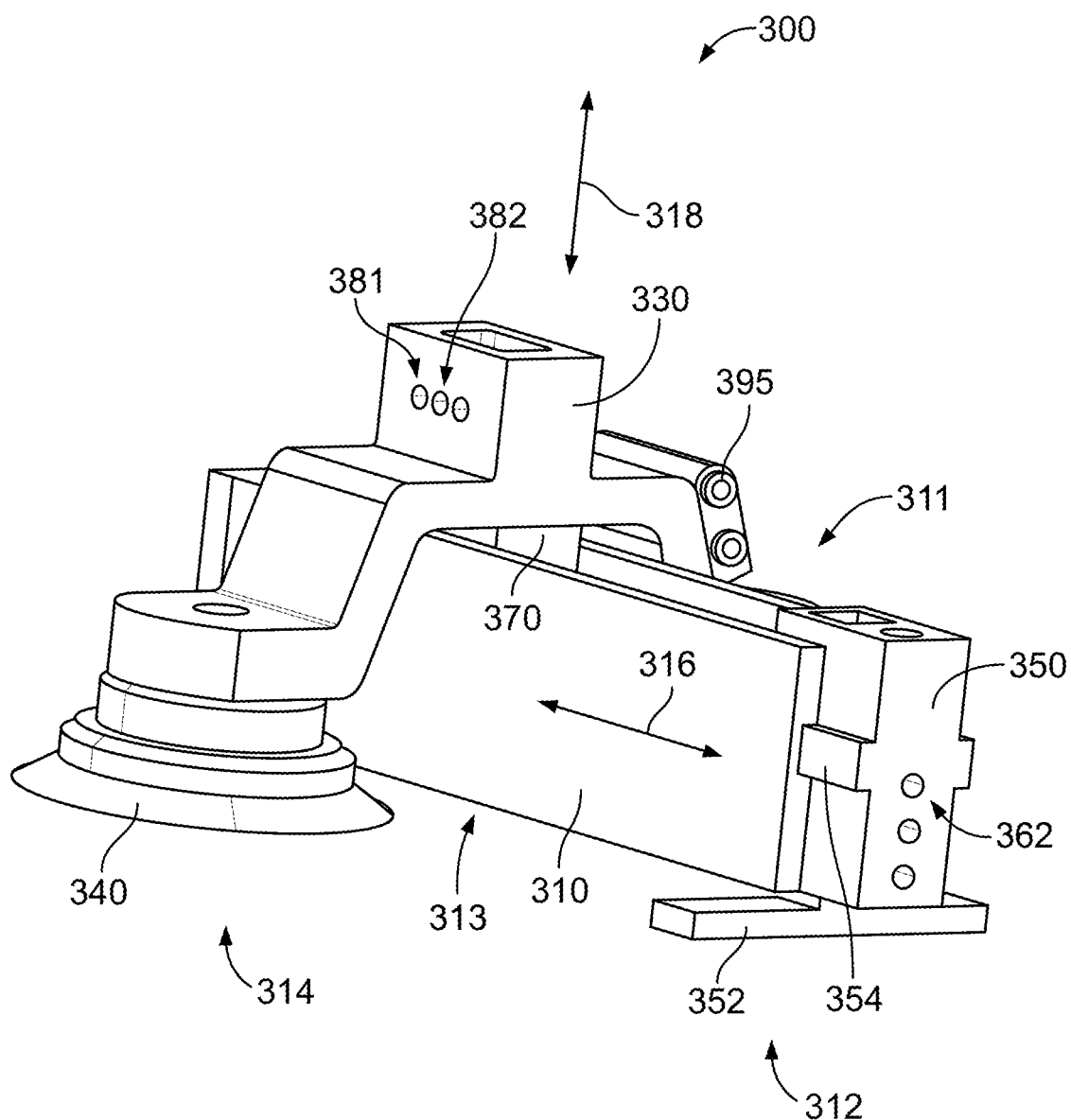
FIG. 4 is a schematic, perspective, view of a sub-assembly of the apparatus of FIGS. 1A and 1B, according to one or more examples of the subject matter, disclosed herein.
Figure 5:
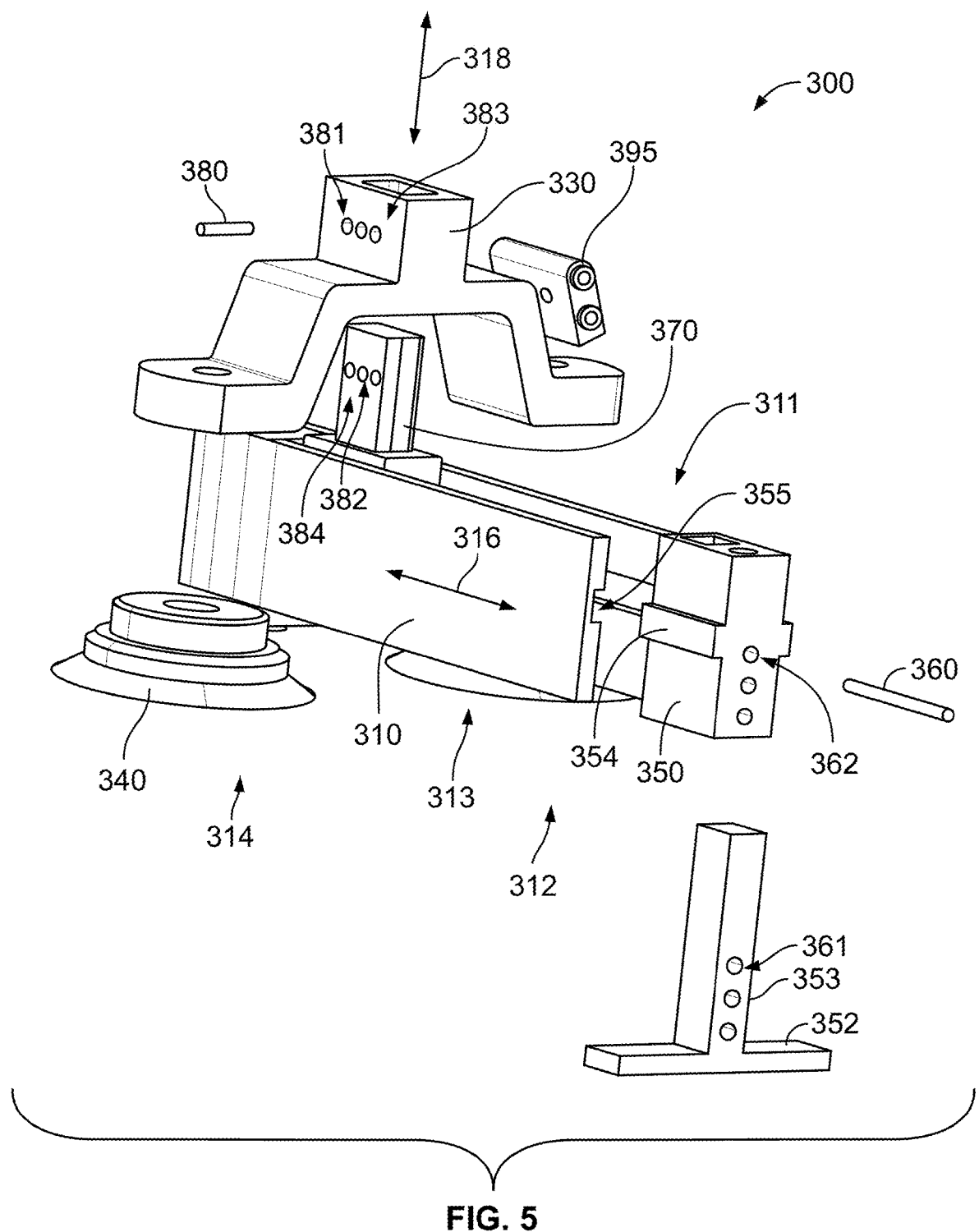
FIG. 5 is a schematic, perspective, exploded view of the sub-assembly of FIG. 4, according to one or more examples of the subject matter, disclosed herein.
Figure 6:
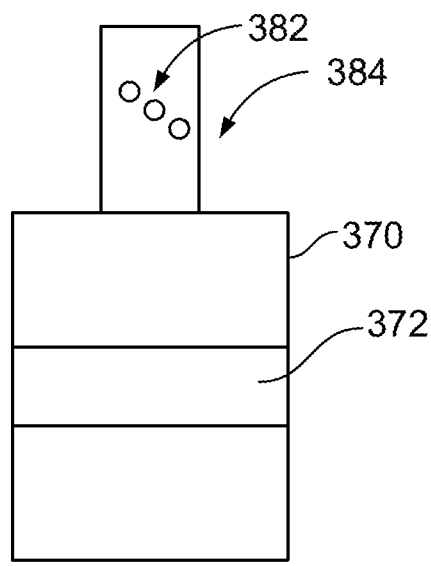
FIG. 6 is a schematic, elevation, side view of a vacuum-cup adjustment arm of the apparatus of FIGS. 1A and 1B, according to one or more examples of the subject matter, disclosed herein.
Figure 7:
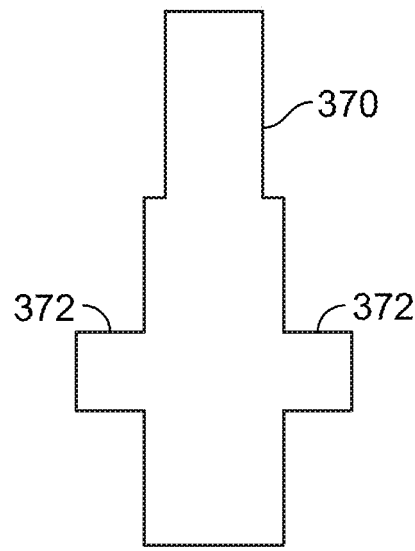
Figure 8:
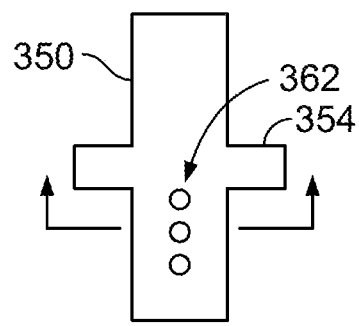
FIG. 8 is a schematic, elevation, side view of a pressure-foot adjustment member of the apparatus of FIGS. 1A and 1B, according to one or more examples of the subject matter, disclosed herein.
Figure 10:
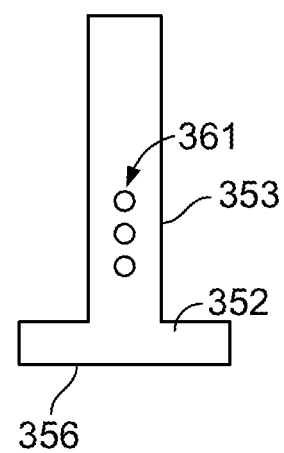
FIG. 10 is a schematic, elevation, side view of a pressure foot of the apparatus of FIGS. 1A and 1B, according to one or more examples of the subject matter, disclosed herein.
Figure 9:
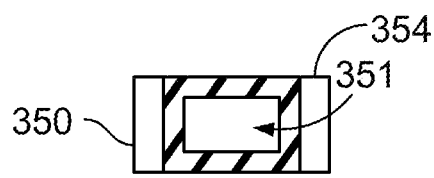
FIG. 9 is a schematic, bottom view of the pressure-foot adjustment member of FIG. 8, according to one or more examples of the subject matter, disclosed herein.

Referring generally to FIGS. 1A and 1B and particularly to, e.g., FIGS. 4 and 5 for illustrative purposes only and not by way of limitation, assembly 300 further comprises vacuum generator 395, fluidically coupled to vacuum cups 340. Vacuum generator 395 is attached to vacuum-cup bracket 330. The preceding portion of this paragraph characterizes example nineteen of the subject matter, disclosed herein, where example nineteen also encompasses any one of examples one to eighteen, above.

Vacuum generator 395 enables releasable securement of assembly 300 in place against base structure 100 and/or component 200. Attachment of vacuum generator 395 to vacuum-cup bracket 330 enables placement of vacuum generator 395 close to vacuum cups 340.

In one or more examples, vacuum generator 395 is in an OFF state when pressure foot 352 and vacuum-cup bracket 330 are being placed in desired positions. Once pressure foot 352, vacuum-cup bracket 330, and centering bushing 320 are positioned appropriately, vacuum generator 395 is actuated to an ON state, in which vacuum is provided to vacuum-cup bracket 330. In one or more examples, power for vacuum generator 395 is provided from an on-board source (e.g., battery), or off-board source.

Referring generally to FIGS. 1A and 1B and particularly to, e.g., FIGS. 2-5 for illustrative purposes only and not by way of limitation, chassis 310 has first side 311 and second side 313, located opposite each other along fourth axis 317 that is perpendicular to first axis 316. Vacuum cups 340 are composed of first vacuum cup 342, positioned on first side 311 of chassis 310, and second vacuum cup 344, positioned on second side 313 of chassis 310. The preceding portion of this paragraph characterizes example twenty of the subject matter, disclosed herein, where example twenty also encompasses any one of examples one to nineteen, above.

Positioning of vacuum cups 340 on opposite sides of chassis 310 provides two points of contact on either side of chassis 310, enabling reduction or elimination of cocking or other undesired movement of vacuum cups 340 and/or vacuum-cup bracket 330 during use of assembly 300.

Figure 13A:
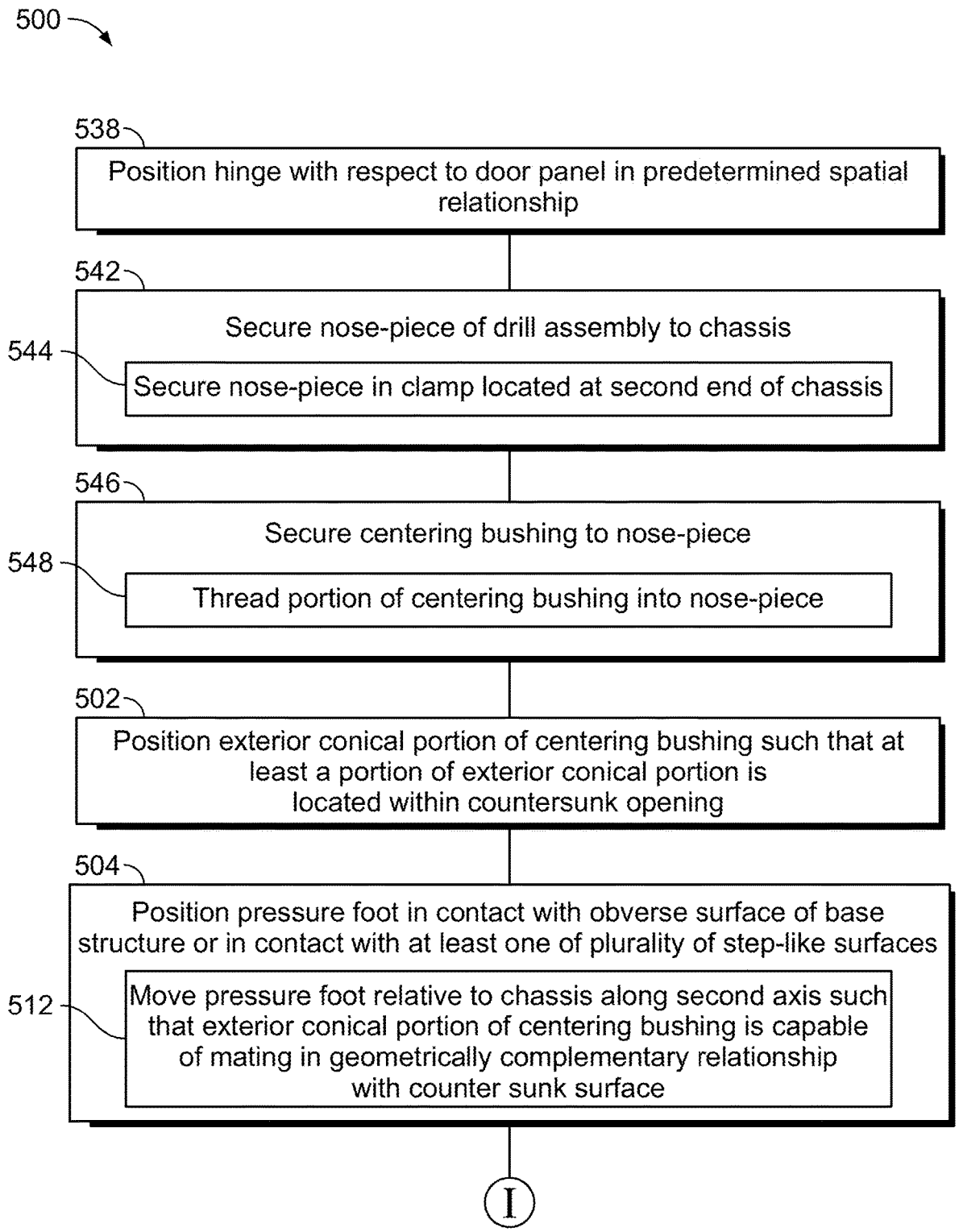
FIGS. 13A, 13B, and 13C, collectively, are a block diagram of a method, according to one or more examples of the subject matter, disclosed herein, of guiding a drill bit, utilizing the apparatus of FIGS. 1A and 1B, according to one or more examples of the subject matter, disclosed herein.
Figure 13B:
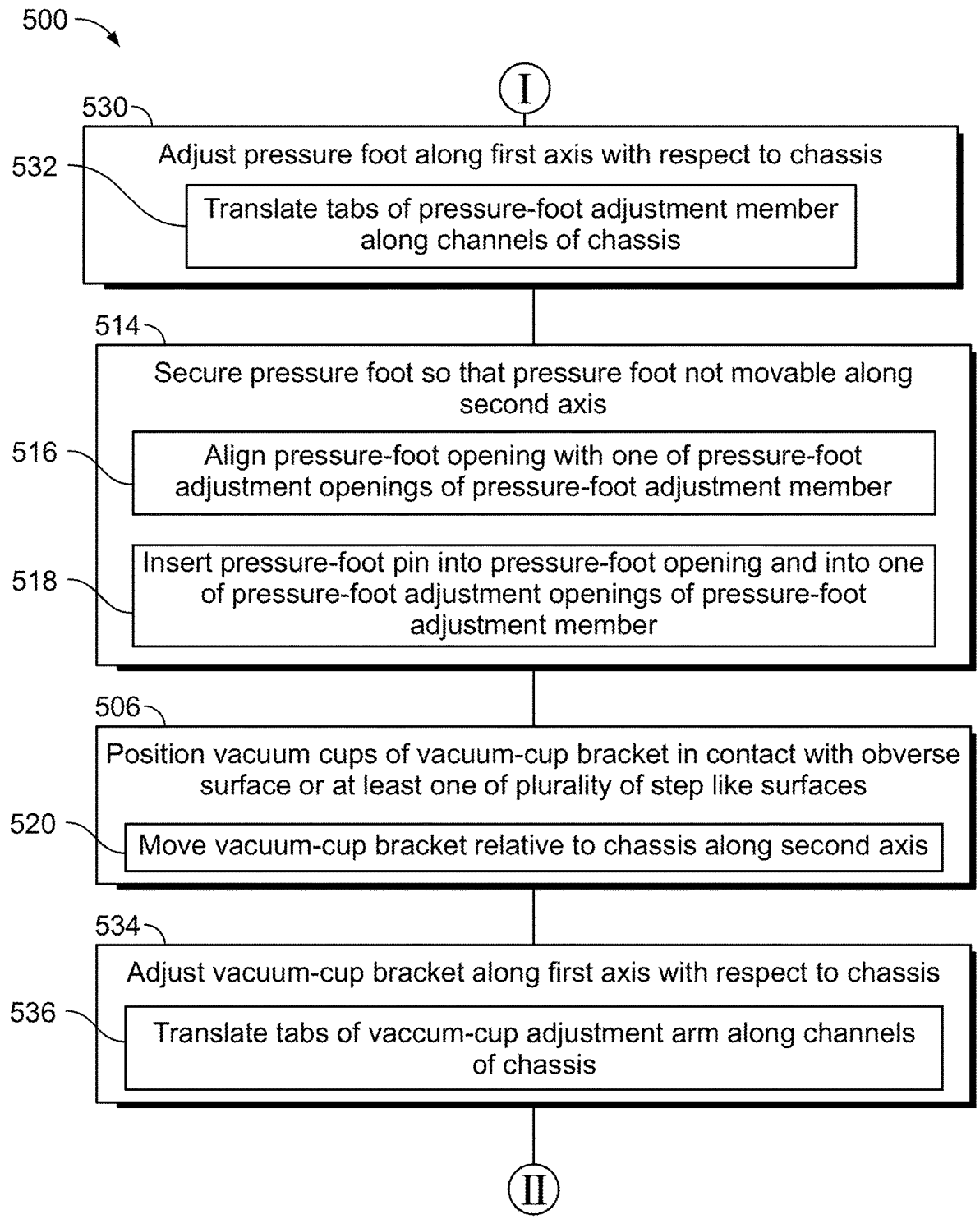
Figure 13C:
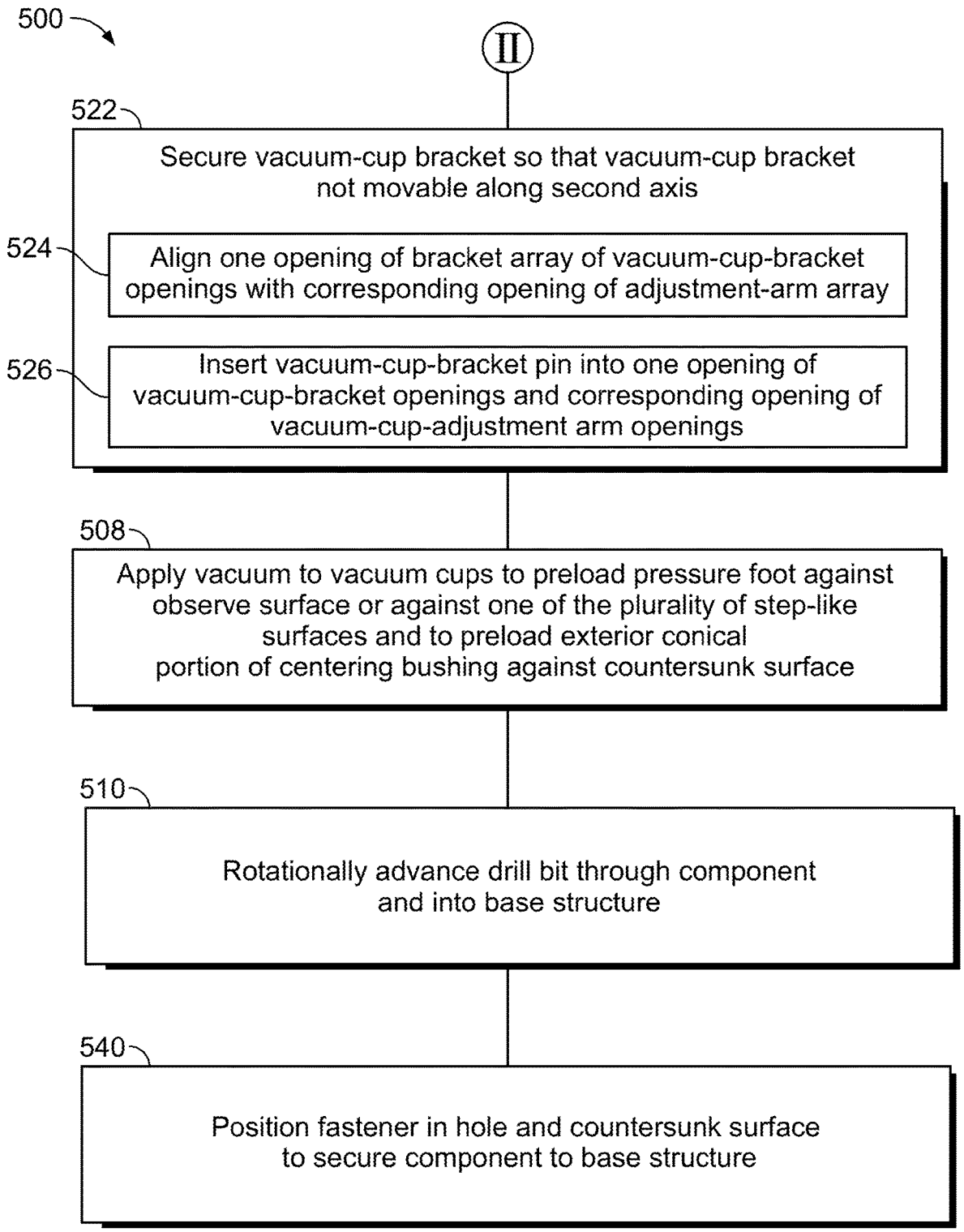

Referring generally to FIGS. 13A, 13B, and 13C and particularly to, e.g., FIGS. 2-12 for illustrative purposes only and not by way of limitation, method 500 of guiding drill bit 404 of drill assembly 400 through component 200 to form hole 102 in base structure 100 is disclosed. Component 200 comprises stepped obverse surface 220, reverse surface 230, spaced from stepped obverse surface 220, and countersunk surface 202. Countersunk surface 202 has a minimum diameter and a maximum diameter and is bounded by stepped obverse surface 220, which comprises plurality of step-like surfaces 210, offset relative to each other. Component 200 is positioned such that at least a portion of reverse surface 230 is in contact with obverse surface 104 of base structure 100. Method 500 comprises (block 502) positioning exterior conical portion 322 of centering bushing 320 such that at least a portion of exterior conical portion 322 is located within countersunk opening 201, defined by countersunk surface 202 of component 200. According to method 500, centering bushing 320 is coupled to chassis 310 that has first end 312 and second end 314, located opposite first end 312 along first axis 316, and centering bushing 320 is located at second end 314 of chassis 310. Method 500 also comprises (block 504) positioning pressure foot 352, coupled to chassis 310 at first end 312 of chassis 310, in contact with obverse surface 104 of base structure 100 or in contact with at least one of plurality of step-like surfaces 210 of component 200. Method 500 further comprises (block 506) positioning vacuum cups 340 of vacuum-cup bracket 330, coupled to chassis 310 between first end 312 and second end 314 of chassis 310, in contact with obverse surface 104 of base structure 100 or in contact with at least one of plurality of step-like surfaces 210 of component 200. Additionally, method 500 comprises (block 508) applying vacuum to vacuum cups 340 to preload pressure foot 352 against obverse surface 104 of base structure 100 or against the one of plurality of step-like surfaces 210 of stepped obverse surface 220 of component 200 and to preload exterior conical portion 322 of centering bushing 320 against countersunk surface 202 of component 200 such that exterior conical portion 322 of centering bushing 320 mates with countersunk surface 202 of component 200 in a geometrically complementary relationship. Method 500 also comprises (block 510) rotationally advancing drill bit 404 through component 200 and into base structure 100 while guiding drill bit 404 using central opening 326 of centering bushing 320 to form, in base structure 100, hole 102 that has a diameter, which is equal to or less than the minimum diameter of countersunk surface 202 of component 200. Hole 102 and countersunk surface 202 share azimuthal-symmetry axis 430. The preceding portion of this paragraph characterizes example twenty-one of the subject matter, disclosed herein.

Method 500 provides convenient, reliable, accurate placement of a drill bit for drilling holes in structure 100. Method 500 facilitates the drilling of multiple holes to match a template (e.g. a pattern of holes in component 200 to be mounted to base structure 100) without requiring use of a drill jig, thereby reducing time of drilling and set-up, reducing cost of additional equipment, and improving accuracy. Positioning exterior conical portion 322 of centering bushing 320 with at least a portion within countersunk opening 201 facilitates convenient, accurate placement of centering bushing 320 to facilitate accurate placement and alignment of drill bit 404. Positioning pressure foot 352 in contact with obverse surface 104 of base structure 100 or in contact with at least one of plurality of step-like surfaces 210 facilitates secure placement and securement of assembly 300 during use. Positioning vacuum cups 340 in contact with obverse surface 104 of base structure 100 or in contact with at least one of plurality of step-like surfaces 210 facilitates secure placement and securement of assembly 300 during use, and facilitates reliable placement of vacuum cups 340 for applying a vacuum to reliably secure assembly 300 in place during drilling of holes. Applying vacuum to vacuum cups 340 releasably secures assembly 300 in place. Rotationally advancing drill bit 404 through component 200 forms a desired hole (e.g., for use in conjunction with a fastener).

Referring generally to FIGS. 13A, 13B, and 13C and particularly to, e.g., FIGS. 2-5, 11, and 12 for illustrative purposes only and not by way of limitation, according to method 500, pressure foot 352 is adjustably positionable relative to chassis 310 along second axis 318 that is normal to first axis 316. According to method 500, (block 504) positioning pressure foot 352 in contact with obverse surface 104 of base structure 100 or in contact with one of plurality of step-like surfaces 210 of component 200 comprises (block 512) moving pressure foot 352 relative to chassis 310 along second axis 318 such that exterior conical portion 322 of centering bushing 320 is capable of mating with countersunk surface 202 of component 200 in the geometrically complementary relationship. The preceding portion of this paragraph characterizes example twenty-two of the subject matter, disclosed herein, where example twenty-two also encompasses example twenty-one, above.

Adjustably positioning pressure foot along second axis 318 facilitates use of pressure foot in connection with varying elevations relative to a surface in which a hole is to be drilled. Moving pressure foot 352 relative to chassis 310 such that exterior conical portion 322 is capable of mating with countersunk surface 202 in the geometrically complementary relationship facilitates proper placement of pressure foot 352 for accurate drilling of holes.

Referring generally to FIGS. 13A, 13B, and 13C and particularly to, e.g., FIGS. 2-5 for illustrative purposes only and not by way of limitation, method 500 further comprises (block 514) securing pressure foot 352 so that pressure foot 352 is not movable along second axis 318. The preceding portion of this paragraph characterizes example twenty-three of the subject matter, disclosed herein, where example twenty-three also encompasses example twenty-two, above.

Securing pressure foot 352 so that it is not movable along second axis 318 maintains assembly 300 in a desired position while other components are positioned and/or vacuum is applied.

Referring generally to FIGS. 13A, 13B, and 13C and particularly to, e.g., FIGS. 2-5 and 8-10 for illustrative purposes only and not by way of limitation, according to method 500, (block 514) securing pressure foot 352 so that pressure foot 352 is not movable along second axis 318 comprises (block 516) aligning pressure-foot opening 361, extending along first axis 316, with one of pressure-foot adjustment openings 362 of pressure-foot adjustment member 350, which is coupled to chassis 310 and to pressure foot 352, and (block 518) inserting pressure-foot pin 360 into pressure-foot opening 361 and into one of pressure-foot adjustment openings 362 of pressure-foot adjustment member 350. The preceding portion of this paragraph character-izes example twenty-four of the subject matter, disclosed herein, where example twenty-four also encompasses example twenty-three, above.

Use of pressure-foot pin 360 with aligned pressure-foot opening 361 and pressure-foot adjustment opening 362 facilitates secure, releasable positioning of pressure foot 352.

Referring generally to FIGS. 13A, 13B, and 13C and particularly to, e.g., FIGS. 2-5, 11, and 12 for illustrative purposes only and not by way of limitation, according to method 500, vacuum-cup bracket 330 is adjustably positionable relative to chassis 310 along second axis 318 that is normal to first axis 316. According to method 500, (block 506) positioning vacuum cups 340 of vacuum-cup bracket 330 in contact with obverse surface 104 of base structure 100 or in contact with one of plurality of step-like surfaces 210 of component 200 comprises (block 520) moving vacuum-cup bracket 330 relative to chassis 310 along second axis 318. The preceding portion of this paragraph characterizes example twenty-five of the subject matter, disclosed herein, where example twenty-five also encompasses any one of examples twenty-one to twenty-four, above.

Moving vacuum-cup bracket 330 relative to chassis along second axis 318 facilitates accurate positioning of vacuum-cups 340 against a surface to which vacuum-cups 340 are to be secured with applied vacuum.

Referring generally to FIGS. 13A, 13B, and 13C and particularly to, e.g., FIGS. 2-5 for illustrative purposes only and not by way of limitation, method 500 further comprises (block 522) securing vacuum-cup bracket 330 so that vacuum-cup bracket 330 is not movable along second axis 318. The preceding portion of this paragraph characterizes example twenty-six of the subject matter, disclosed herein, where example twenty-six also encompasses example twenty-five, above.

Securing the vacuum-cup bracket so that it is not movable along second axis 318 maintains assembly 300 in a desired position while vacuum is applied.

Referring generally to FIGS. 13A, 13B, and 13C and particularly to, e.g., FIGS. 2-7 for illustrative purposes only and not by way of limitation, according to method 500, (block 522) securing vacuum-cup bracket 330 so that vacuum-cup bracket 330 is not movable along second axis 318 comprises (block 524) aligning one opening of bracket array 383 of vacuum-cup-bracket openings 381 with corresponding opening of adjustment-arm array 384 of vacuum-cup-adjustment-arm openings 382. According to method 500, adjustment-arm array 384 of vacuum-cup-adjustment-arm openings is located in vacuum-cup adjustment arm 370. Vacuum-cup adjustment arm 370 is coupled to chassis 310 and to vacuum-cup bracket 330. Bracket array 383 of vacuum-cup-bracket openings 381 is located in vacuum-cup bracket 330. According to method 500, (block 522) securing vacuum-cup bracket 330 so that vacuum-cup bracket 330 is not movable along second axis 318 also comprises (block 526) inserting vacuum-cup-bracket pin 380 into one opening of vacuum-cup-bracket openings 381 and into the corresponding opening of vacuum-cup-adjustment-arm openings 382. The preceding portion of this paragraph characterizes example twenty-seven of the subject matter, disclosed herein, where example twenty-seven also encompasses example twenty-six, above.

Use of vacuum-cup-bracket pin 380 with aligned vacuum-cup-bracket opening 381 and vacuum-cup-adjustment-arm openings 382 facilitates reliable, releasable securement of vacuum-cup bracket 330 in a desired position. Use of bracket array 383 and adjustment-arm array 384 facilitates adjustability of positioning vacuum-cup bracket 330 (and vacuum cups 340) with respect to chassis 310.

Referring generally to FIGS. 13A, 13B, and 13C and particularly to, e.g., FIGS. 2-5 and 11-12 for illustrative purposes only and not by way of limitation, according to method 500, (block 504) positioning pressure foot 352 in contact with obverse surface 104 of base structure 100 or in contact with one the plurality of step-like surfaces 210 of component 200 comprises (block 512) moving pressure foot 352 relative to chassis 310 along second axis 318, such that exterior conical portion 322 of centering bushing 320 is capable of mating with countersunk surface 202 of component 200 in the geometrically complementary relationship. The preceding portion of this paragraph characterizes example twenty-eight of the subject matter, disclosed herein, where example twenty-eight also encompasses any one of examples twenty-five to twenty-seven, above.

Adjustably positioning pressure foot along second axis 318 facilitates use of pressure foot in connection with varying elevations relative to a surface, in which a hole is to be drilled. Moving pressure foot 352 relative to chassis 310 such that exterior conical portion 322 is capable of mating with countersunk surface 202 in the geometrically complementary relationship facilitates proper placement of pressure foot 352 for accurate drilling of holes.

Referring generally to FIGS. 13A, 13B, and 13C and particularly to, e.g., FIGS. 2-5 and 11-12 for illustrative purposes only and not by way of limitation, according to method 500, exterior conical portion 322 of centering bushing 320 has first azimuthal-symmetry axis 324. Central opening 326 of centering bushing 320 has second azimuthal-symmetry axis 327 that is collinear with first azimuthal-symmetry axis 324. First azimuthal-symmetry axis 324 and second azimuthal-symmetry axis 327 are aligned with azimuthal-symmetry axis 430 of hole 102 and countersunk surface 202 when exterior conical portion 322 of centering bushing 320 mates with countersunk surface 202 of component 200 in the geometrically complementary relationship. The preceding portion of this paragraph characterizes example twenty-nine of the subject matter, disclosed herein, where example twenty-nine also encompasses any one of examples twenty-one to twenty-eight, above.

Use of collinear azimuthal-symmetry axes of exterior conical portion 322 and central opening 326 of centering bushing 320 that align with azimuthal-symmetry axis 430 of hole 102 and countersunk surface 202 facilitates accurate placement of centering bushing 320 for accurate drilling of holes with drill bit 404.

Referring generally to FIGS. 13A, 13B, and 13C and particularly to, e.g., FIGS. 2-5 for illustrative purposes only and not by way of limitation, method 500 further comprises (block 530) adjusting pressure foot 352 along first axis 316 with respect to chassis 310. The preceding portion of this paragraph characterizes example thirty of the subject matter, disclosed herein, where example thirty also encompasses any one of examples twenty-one to twenty-nine, above.

Adjusting pressure foot 352 along first axis 316 with respect to chassis 310 facilitates secure placement of pressure foot 352 at a desired position, for example with pressure foot 352 positioned on a level surface, for example a particular stepped surface or other target placement zone.

Referring generally to FIGS. 13A, 13B, and 13C and particularly to, e.g., FIGS. 2-5 and 8-9 for illustrative purposes only and not by way of limitation, according to method 500, (block 530) adjusting pressure foot 352 along first axis 316 with respect to chassis 310 comprises (block 532) translating, along channels 355 of chassis 310, tabs 354 of pressure-foot adjustment member 350 that is coupled to pressure foot 352. The preceding portion of this paragraph characterizes example thirty-one of the subject matter, disclosed herein, where example thirty-one also encompasses example thirty, above.

Use of channels 355 of chassis 310 and tabs 354 of pressure-foot adjustment member 350 that cooperate with each other enables convenient, continuous adjustability of pressure-foot adjustment member 350 with respect to chassis 310.

Referring generally to FIGS. 13A, 13B, and 13C and particularly to, e.g., FIGS. 2-5 for illustrative purposes only and not by way of limitation, method 500 further comprises (block 534) adjusting vacuum-cup bracket 330 along first axis 316 with respect to chassis 310. The preceding portion of this paragraph characterizes example thirty-two of the subject matter, disclosed herein, where example thirty-two also encompasses example thirty-one, above.

Adjusting vacuum-cup bracket 330 along first axis 316 with respect to chassis 310 facilitates secure placement of vacuum-cup bracket 330 (and vacuum-cups 340) at a desired position, for example with vacuum cups 340 positioned on a level surface, for example a particular stepped surface or other target placement zone.

Referring generally to FIGS. 13A, 13B, and 13C and particularly to, e.g., FIGS. 2-7 for illustrative purposes only and not by way of limitation, according to method 500, (block 534) adjusting vacuum-cup bracket 330 along first axis 316 with respect to chassis 310 comprises (block 536) translating, along channels 355 of chassis 310, tabs 372 of vacuum-cup adjustment arm 370 that is coupled to vacuum-cup bracket 330. The preceding portion of this paragraph characterizes example thirty-three of the subject matter, disclosed herein, where example thirty-three also encompasses example thirty-two, above.

Use of channels 355 of chassis 310 and tabs 372 of vacuum-cup adjustment arm 370 that cooperate with each other enables convenient, continuous adjustability of vacuum-cup bracket 330 (and vacuum cups 340) with respect to chassis 310 (e.g., along first axis 316).

Referring generally to FIGS. 13A, 13B, and 13C and particularly to, e.g., FIGS. 2-5 and 11-12 for illustrative purposes only and not by way of limitation, according to method 500, component 200 is hinge 203, and base structure 100 is door pane 101 of an aircraft. Method 500 further comprises (block 538) positioning hinge 203 with respect to door panel 101 in a predetermined spatial relationship with respect to door panel 101 before positioning exterior conical portion 322 of centering bushing 320 such that at least a portion of exterior conical portion 322 is located within countersunk opening 201, defined by countersunk surface 202 of component 200. The preceding portion of this paragraph characterizes example thirty-four of the subject matter, disclosed herein, where example thirty-four also encompasses any one of examples twenty-one to thirty-three, above.

Positioning hinge 203 in the predetermined spatial relationship with door panel 101 facilitates accurate drilling of holes for mounting hinge 203 in an appropriate position for use with the aircraft.

The predetermined spatial relationship corresponds to the desired position of hinge 203 with respect to door panel 101 during operation of the aircraft. In one or more examples, hinge 203 and/or door panel 101 includes a visual marker, used in connection with positioning hinge 203 in the predetermined spatial relationship with respect to door panel 101. In one or more examples, door panel 101 includes one or more lines indicating where one or more edges of hinge 203 are placed. Alternatively, in one or more example, door panel 101 includes one or more tabs or other projections, against which a portion of hinge 203 is abutted to place hinge 203 in the predetermined spatial relationship. In one or more examples, hinge 203 is clamped to door panel 101 or is otherwise secured in place after being positioned in the predetermined spatial relationship.

Referring generally to FIGS. 13A, 13B, and 13C and particularly to, e.g., FIGS. 2-5, 11, and 12 for illustrative purposes only and not by way of limitation, method 500 further comprises (block 540) positioning fastener 207 in hole 102 and in countersunk opening 201 to secure component 200 to base structure 100. The preceding portion of this paragraph characterizes example thirty-five of the subject matter, disclosed herein, where example thirty-five also encompasses any one of examples twenty-one to thirty-four, above.

Use of fastener 207 facilitates secure placement of component 200 to base structure 100.

In one or more examples, fastener 207 includes a capscrew with a countersunk head and a nut that accepts threads of the capscrew.

Referring generally to FIGS. 13A, 13B, and 13C and particularly to, e.g., FIGS. 2-5 and 12 for illustrative purposes only and not by way of limitation, according to method 500, pressure foot 352 is placed in contact with obverse surface 104 of base structure 100, and vacuum cups 340 are placed in contact with at least one of plurality of step-like surfaces 210. The preceding portion of this paragraph characterizes example thirty-six of the subject matter, disclosed herein, where example thirty-six also encompasses any one of examples twenty-one to thirty-five, above.

Placement of pressure foot 352 in contact with obverse surface 104 and vacuum cups 340 in contact with at least one of plurality step-like surfaces 210 provides for secure, convenient mounting of assembly 300 in various examples.

Referring generally to FIGS. 13A, 13B, and 13C and particularly to, e.g., FIGS. 2-5 and 12 for illustrative purposes only and not by way of limitation, according to method 500, pressure foot 352 is placed in contact with first step-like surface 211 of plurality of step-like surfaces 210, and vacuum cups 340 are placed in contact with second step-like surface 212 of plurality of step-like surfaces 210. The preceding portion of this paragraph characterizes example thirty-seven of the subject matter, disclosed herein, where example thirty-seven also encompasses any one of examples twenty-one to thirty-five, above.

Placement of pressure foot 352 in contact with first step-like surface 211 and vacuum cups 340 in contact with second step-like surface 212 provides for secure, convenient mounting of assembly 300 in various examples, for instance where a number of step-like surfaces are present.

In one or more examples, rows or arrays of holes are drilled at different locations relative to obverse surface 104 and plurality of step-like surfaces 210. In one or more examples, pressure foot 352 and/or vacuum cups 340 are positioned differently for different rows. In one or more examples, for one row, pressure foot 352 is on first step-like surface 211 and the vacuum cups are on second step-like surface 212. For a different row, however, pressure foot 352 is on obverse surface 104 and vacuum cups 340 are on a different one of plurality of step-like surfaces 210. Adjustability along first axis 316 and/or second axis 318 enables different placement configurations to be used on component 200 and base structure 100 to account for different hole locations.

Referring generally to FIGS. 13A, 13B, and 13C and particularly to, e.g., FIGS. 2-3 for illustrative purposes only and not by way of limitation, method 500 further comprises (block 542) securing nose-piece 402 of drill assembly 400 to chassis 310. The preceding portion of this paragraph characterizes example thirty-eight of the subject matter, disclosed herein, where example thirty-eight also encompasses any one of examples twenty-one to thirty-seven, above.

Securement of nose-piece 402 to chassis 310 facilitates accurate placement and use of drill bit 404 during use.

Referring generally to FIGS. 13A, 13B, and 13C and particularly to, e.g., FIGS. 2 and 3 for illustrative purposes only and not by way of limitation, according to method 500, (block 542) securing nose-piece 402 of drill assembly 400 to chassis 310 comprises (block 544) securing nose-piece 402 in clamp 390, located at second end 314 of chassis 310. The preceding portion of this paragraph characterizes example thirty-nine of the subject matter, disclosed herein, where example thirty-nine also encompasses example thirty-eight, above.

Securement of nose-piece 402 to chassis 310 using clamp 390 facilitates accurate placement and use of drill bit 404 during use, and convenient removal of nose-piece 402 after use.

Referring generally to FIGS. 13A, 13B, and 13C and particularly to, e.g., FIGS. 2 and 3 for illustrative purposes only and not by way of limitation, method 500 further comprises (block 546) securing centering bushing 320 to nose-piece 402. The preceding portion of this paragraph characterizes example forty of the subject matter, disclosed herein, where example forty also encompasses example thirty-eight or thirty-nine, above.

Securement of centering bushing 320 to nose-piece 402 of drill assembly 400 provides convenient reliable securement of drill assembly 400 and assembly 300 with respect to each other during use.

Referring generally to FIGS. 13A, 13B, and 13C and particularly to, e.g., FIGS. 2 and 3 for illustrative purposes only and not by way of limitation, according to method 500, (block 546) securing centering bushing 320 to nose-piece 402 comprises (block 548) threading a portion of centering bushing 320 into nose-piece 402. The preceding portion of this paragraph characterizes example forty-one of the subject matter, disclosed herein, where example forty-one also encompasses example forty, above.

Threading of centering bushing 320 into nose-piece 402 enables convenient, reliable, releasable securement of centering bushing 320 to nose-piece 402.

Figure 14:
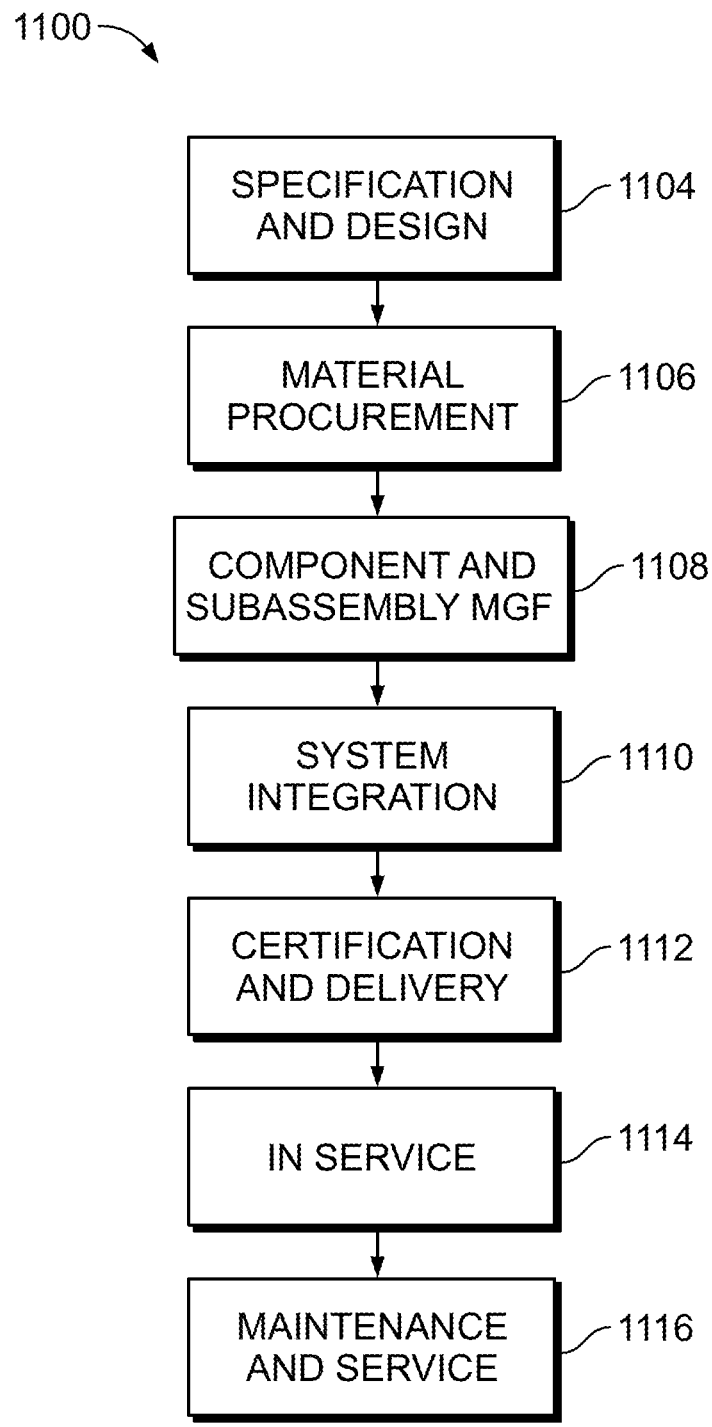
FIG. 14 is a block diagram of aircraft production and service methodology.
Figure 15:
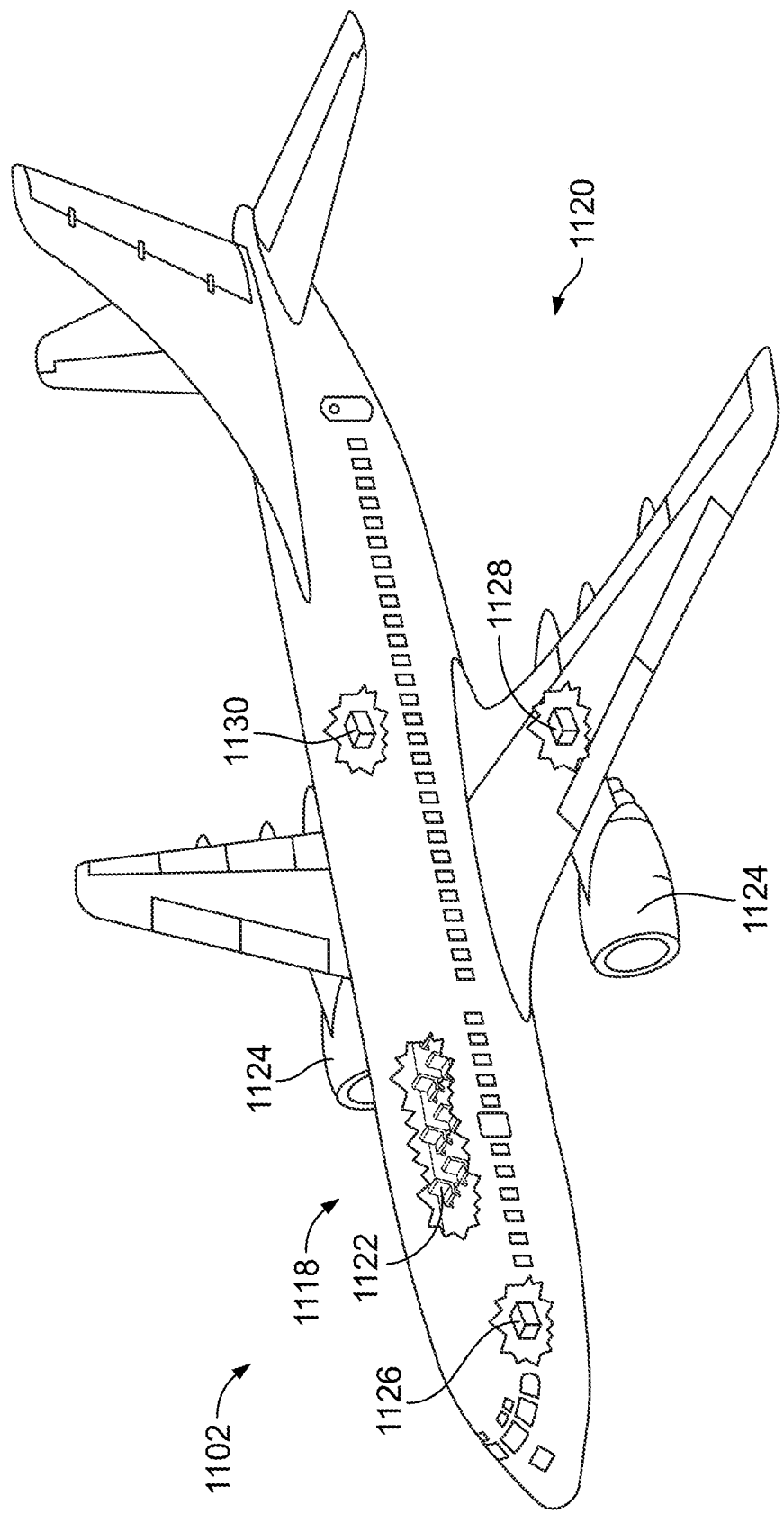
FIG. 15 is a schematic illustration of an aircraft.

Examples of the subject matter, disclosed herein may be described in the context of aircraft manufacturing and service method 1100 as shown in FIG. 14 and aircraft 1102 as shown in FIG. 15. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 15, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus (es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s), disclosed herein, may include any of the components, features, and functionalities of any of the other examples of the apparatus (es) and method(s) disclosed herein in any combination.

Many modifications of examples, set forth herein, will come to mind of one skilled in the art, having the benefit of the teachings, presented in the foregoing descriptions and the associated drawings.

Therefore, it is to be understood that the subject matter, disclosed herein, is not to be limited to the specific examples illustrated and that modifications and other examples are intended to be included within the scope of the appended claims. Moreover, although the foregoing description and the associated drawings describe examples of the subject matter, disclosed herein, in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided herein.

What is claimed is:

1. An assembly for guiding a drill bit of a drill assembly, the drill assembly comprising a nose-piece, having an upper end and a lower end, the assembly comprising:
   a chassis, having a first end and a second end, located opposite each other along a first axis;
   a centering bushing, located at the second end of the chassis and comprising:
      an exterior conical portion, having a first azimuthal-symmetry axis; and
      a central opening, having a second azimuthal-symmetry axis, collinear with the first azimuthal-symmetry axis;
   a vacuum-cup bracket, coupled to the chassis between the first end and the second end and adjustably positionable relative to the chassis along a second axis that is normal to the first axis;
   vacuum cups, coupled to the vacuum-cup bracket; and
   a pressure foot, coupled to the chassis at the first end of the chassis and adjustably positionable relative to the chassis along the second axis.

2. The assembly according to claim 1, wherein the pressure foot is adjustably positionable relative to the chassis along the first axis.

3. The assembly according to claim 2, further comprising a pressure-foot adjustment member, coupled to the chassis and translatable relative to the chassis, wherein the pressure foot is coupled to the chassis via the pressure-foot adjustment member.

4. The assembly according to claim 3, wherein:
   the pressure foot comprises a pressure-foot body; and
   the pressure-foot adjustment member comprises a cavity, configured to receive the pressure-foot body, wherein the cavity extends along the second axis.

5. The assembly according to claim 3, wherein the chassis comprises channels, extending along the first axis, and the pressure-foot adjustment member comprises tabs that are received by the channels of the chassis.

6. The assembly according to claim 5, wherein the vacuum-cup bracket is adjustably positionable relative to the chassis along the first axis.

7. The assembly according to claim 6, further comprising a vacuum-cup adjustment arm, coupled to the chassis and movable relative to the chassis, wherein the vacuum-cup bracket is coupled to the chassis via the vacuum-cup adjustment arm.

8. The assembly according to claim 7, wherein the vacuum-cup adjustment arm comprises tabs that are received by the channels of the chassis.

9. The assembly according to claim 1, further comprising a pressure-foot pin, wherein:
   the pressure foot comprises a pressure-foot opening, extending along the first axis; and
   the pressure-foot pin is capable of being received by the pressure-foot opening.

10. The assembly according to claim 9, further comprising a pressure-foot adjustment member, fixed to the chassis along the second axis and comprising pressure-foot adjustment openings, situated at different locations along the second axis, wherein any one of the pressure-foot adjustment openings and the pressure-foot opening are capable of collectively receiving the pressure-foot pin to fix the pressure foot relative to the chassis along the second axis.

11. The assembly according to claim 1, wherein:
   the assembly further comprises a vacuum-cup-bracket pin;
   the vacuum-cup bracket comprises a bracket array of vacuum-cup-bracket openings, each extending along an axis, perpendicular to second axis; and
   any one of the vacuum-cup-bracket openings is capable of receiving the vacuum-cup-bracket pin.

12. The assembly according to claim 11, further comprising a vacuum-cup adjustment arm, which is fixed to the chassis along the second axis and which comprises an adjustment-arm array of vacuum-cup-adjustment-arm openings, wherein any one of the vacuum-cup-adjustment-arm openings and a corresponding one of the vacuum-cup-bracket openings are capable of collectively receiving the vacuum-cup-bracket pin so that the vacuum-cup bracket is fixed relative to the chassis along the second axis.

13. The assembly according to claim 12, wherein one of the adjustment-arm array of the vacuum-cup-adjustment-arm openings or the bracket array of the vacuum-cup-bracket openings extends along the first axis, and the other one of the adjustment-arm array of the vacuum-cup-adjustment-arm openings or the bracket array of the vacuum-cup-bracket openings is oblique to the first axis.

14. The assembly according to claim 1, wherein:
the chassis comprises a clamp, located at the second end of the chassis; and
the clamp is configured to secure the nose-piece of the drill assembly.

15. The assembly according to claim 14, wherein the clamp of the chassis comprises an upper portion, configured to be connected to the upper end of the nose-piece, and a lower portion, configured to be connected to the lower end of the nose-piece.

16. The assembly according to claim 14, wherein the centering bushing is secured to the nose-piece of the drill assembly when the nose-piece is secured in the clamp.

17. The assembly according to claim 16, wherein the centering bushing is threaded into the nose-piece of the drill assembly when the nose-piece is secured in the clamp.

18. The assembly according to claim 1, wherein the exterior conical portion of the centering bushing defines a taper angle, which is complementary to that, defined by a countersunk surface, against which the centering bushing is positioned during use of the drill bit.

19. The assembly according to claim 1, further comprising a vacuum generator, fluidically coupled to the vacuum cups, wherein the vacuum generator is attached to the vacuum-cup bracket.

20. The assembly according to claim 1, wherein:
the chassis has a first side and a second side, located opposite each other along a third axis that is perpendicular to the first axis; and
the vacuum cups are composed of a first vacuum cup, positioned on the first side of the chassis, and a second vacuum cup, positioned on the second side of the chassis.

* * * * *